United States Patent
Altare

(10) Patent No.: US 7,468,682 B2
(45) Date of Patent: Dec. 23, 2008

(54) PORTABLE RECORDER/PLAYERS WITH POWER-SAVING BUFFERS

(75) Inventor: Christopher Altare, Oceanside, CA (US)

(73) Assignee: Echo Mobile Music LLP, San Diego, CA (US)

(*) Notice: Subject to any disclaimer, the term of this patent is extended or adjusted under 35 U.S.C. 154(b) by 525 days.

(21) Appl. No.: 10/939,849

(22) Filed: Sep. 13, 2004

(65) Prior Publication Data

US 2005/0185526 A1 Aug. 25, 2005

Related U.S. Application Data

(63) Continuation-in-part of application No. 09/860,935, filed on May 18, 2001, now Pat. No. 6,791,481.

(60) Provisional application No. 60/205,936, filed on May 18, 2000.

(51) Int. Cl.
*H03M 7/00* (2006.01)

(52) U.S. Cl. .................. 341/50; 369/47.13

(58) Field of Classification Search .......... 341/50; 369/47.13, 47.32, 47.12; 711/113, 112; 713/320; 386/124
See application file for complete search history.

(56) References Cited

U.S. PATENT DOCUMENTS

| 6,332,175 | B1 | 12/2001 | Birrell et al. |
| 6,772,284 | B2* | 8/2004 | Ikeda ................ 711/113 |
| 2001/0043524 | A1* | 11/2001 | Utsumi ............. 369/47.13 |
| 2003/0135770 | A1* | 7/2003 | Bhogal et al. ........ 713/320 |

* cited by examiner

*Primary Examiner*—Rexford Barnie
*Assistant Examiner*—Joseph Lauture
(74) *Attorney, Agent, or Firm*—Fuess & Davidenas

(57) ABSTRACT

In electronic devices such as combination CD-ROM and MP3 recorder/players power is conserved by buffering audio or visual data in a solid state memory, preferably of the FLASH or DRAM type, before writing the data to a rotating hard disk. Alternatively, audio and/or visual data, including musical works and still pictures and video, read from a rotating hard disk may be buffered in the same solid state memory while being played. By rotating the hard disk drive only for transfer of audio-visual data, which is normally compressed, in blocks, the hard drive may be stopped both during relative lengthy accumulation, and/or use, of this data, and energy conserved.

36 Claims, 16 Drawing Sheets

PORTABLE RECORDER/PLAYERS WITH POWER-SAVING BUFFERS

REFERENCE TO RELATED PATENT APPLICATIONS

The present patent application is related as a continuation-in-part, and claims benefit of priority of, (1) U.S. provisional patent application Ser. No. 60/205,936 filed on May 18, 2000 for an ECHO MUSIC SYSTEM, and (2) U.S. utility patent application Ser. No. 09/860,935 filed May 18, 2001, now U.S. Pat. No. 6,791,481 for a PORTABLE CD-ROM/ISO TO HDD/MP3 RECORDER WITH SIMULTANEOUS CD-READ/MP3-ENCODE/HDD-WRITE, OR HDD-READ/MP3-DECODE, TO PLAY, POWER-SAVING BUFFER, AND ENHANCED SOUND OUTPUT, both to the selfsame Chris Altare who is the inventor of the present patent application.

The contents of these related, predecessor, patent applications are incorporated herein by reference.

BACKGROUND OF THE INVENTION

1. Field of the Invention

The present invention generally concerns recorder/players, or player/recorders, of visual and audio information, especially as may be (i) combined and (ii) portable.

The present invention particularly concerns conservation of power in combination recorder/players wherein significant power is consumed in a rotating disk memory store.

2. Description of the Prior Art 2.1 Encoding/Recording MP3 Files On, and Playing MP3 Files From, a Hard Disk Drive (HDD)

Portable CD-ROM players having been around several years, portable players of MP3 files have recently (circa 2001) become popular. Some portable player-recorders are capable of dealing with both CD-ROM and MP3 media, as the player-recorder of the present invention will prove to be capable of. However, in order to encode MP3 from CD-ROM in real time, a processor/microprocessor of considerable capability has heretofore been required, making that this process has normally been performed in computers, and limiting the application of the necessary processing power to portable units, especially as may be powered by batteries.

The combination portable CD-ROM and MP3 player-recorder of the present invention will be seen not only to use a new low-power MP3 encoder/decoder chip that permits the encoding of MP3 words at rates equal to and greater than normal play speeds, but to use this chip flexibly, and to new ends of creating MP3 digital words that are not of the same bit-width, and sound quality, as are the digital words of a compressed ISO standard CD-ROM which these MP words serve to supplant.

Additionally in the prior art, some units, not normally portable and often associated with computers as drives, are capable of duplicating MP3 format media at greater than normal playback speeds. However, due to requirements for extensive computer resource for the reading and writing of necessary files, this level of function has not heretofore been deemed realistically realizable with a portable, battery-powered, MP3 player-recorder.

2.2 Conservation of Power in CD-ROM and MP3 Player-recorders, Including in Combination CD-ROM and MP3 Player-recorders It has been recognized that power may be conserved in CD-ROM and MP3 player-recorders, and in combination CD-ROM and MP3 player-recorders, by the simple expedient of turning off functional sections of the device, especially rotating devices such as CD-ROM and hard disk drives, when not in use.

However, little attention has been given to designing a combination CD-ROM and MP3 player-recorder form "the ground up" so as to minimize the uses, and the durations of uses, or high-powered sections at the possible costs of new sections, and/or the longer and/or new uses of lower-powered sections. The present invention will be seen to employ (i) a semiconductor memory in combination with both of (ii) a CD/ROM player, and also a (iii) hard disk drive for both recording and playing, to the particular purpose of minimizing the time that both the (ii) CD/ROM player, and the (iii) HDD are operative, consuming power, during normal player-recorder functions.

2.3 Retrospective Initiation of Recording in, and Computer-less High-speed Transfer Between, MP3 Player-recorders The concept that something that is being played, such as a tract on a CD-ROM, could selectively, retrospectively, be chosen to be saved, or not to be saved, mandates that there is something to save resulting from the playing, to wit: a file. The creation, and the storage, of MP3 encoded files has in the past most normally required, respectively, (i) the action of a processor or microprocessor running an operating system having instructions or microcode most normally resident on, and read from, a HDD, along with (ii) the lodging of files on a HDD. The running of both a processor/microprocessor and a HDD has deemed to be so energy intensive in a portable, battery-powered device, that no accommodation has been given to "retrospectively throwing away" a just-made MP3 file. At best the user/listener can go and delete, usually from a HDD, the file just made.

The present invention will show how to make an MP3 file in a portable, battery powered, with such energy economy that it is not detrimental to listen to a CD-ROM, selectively retrospectively keeping certain MP3 files newly encoded from selected tracks of the CD-ROM while completely discarding other newly encoded MP3 files as represent other, unwanted, tracks.

2.4 High-speed RIP of a CD/ROM

Taking the digital contents of an audio (as opposed to a data) CD/ROM into one or more MP3 format files stored upon a computer has been a task requiring considerable computer "horsepower", and has thus been but seldom performed by computers, and, with the seemingly considerable required energy, never (to the best knowledge of the inventors) by portable, battery-powered, combination CD/ROM and MP3 player-recorders. The present invention will be seen to overcome the previous limitations, including in areas of processing and storage and power, in this process by (i) managing the rotating times of disk drives carefully, (ii) buffering CD/ROM data until suitably encoded as MP3, and (iii) again buffering the MP3 data until suitably recorded on a HDD. Everything goes along reasonably speedily at about 4×-6× normal read speed because, inter alia, there is no processor/microprocessor and no operating system and no instructions involved—as is conventional. Instead, the entire MP3 encoding will be seen to be done in a single chip, and the management of all data transfer in another, file manager, chip.

2.5 Computer-less High-speed Transfer Between MP3 Player-recorders

High speed transfer of files, such as MP3 files, requires some measure of correlation in speed of transmit and receive, and some buffering. Heretofore MP3 Player-recorders have been routinely connected to computers for bi-directional transfer of MP3 files in accordance with the greater speed, and buffer capacity, of the computer, but it has not been realized to transfer MP3 files between portable player-recorders themselves, without benefit of any computer.

SUMMARY OF THE INVENTION

In its principle aspect, the present invention contemplates conserving power and reducing heat in audio/visual devices—such as, by way of example, telephones and cameras and combination CD-ROM and MP3 recorder/players—that are commonly both (1) portable and (2) possessed of a rotating memory, commonly a hard disk drive (HDD). The present invention so functions by act of buffering audio or visual data transferred either to (written) and/or from (read) from the device's hard disk drive (HDD) within a solid state, buffer, memory that is most preferably of the FLASH or DRAM type.

By rotating the hard disk drive (HDD) only for buffered, block, transfers of (most normally, and in particular) audio-visual data (which is also normally compressed), the hard drive may be stopped both during relative lengthy (1) accumulations in the buffer memory of data that is ultimately written to the HDD, and (2) use(s) of data that has been read to the buffer memory from the HDD. Stopping the HDD, and reducing the duty cycle during which it is rotating, both (1) conserves energy, and (2) reduces heat—both of which are particularly important in compact, battery-powered, electronic devices such as, inter alia, telephones, still and video cameras, music players and recorders, and combinations of these devices.

1. Percentage Reduction of Hard Disk Drive Duty Cycle

The percentage by which the duty cycle of the hard disk drive (HDD) may be reduced by the buffering action of the present invention is obviously a function of, inter alia, (1) the nature(s), use(s), number of different uses, and rapidity/duration of the use(s) of the information that is buffered, (2) the size of the buffer memory relative to the size of blocks of related information that is transferred to and from the HDD, and (3) the management of the buffer.

1.1 Preferred Management of the Buffer Memory

The preferred embodiment of the present invention uses (3) buffer management scheme that is, nonetheless to being very simple, substantially optimal for most common applications. Namely, the buffer memory is (1) loaded (written) from the HDD until full, or unloaded (read) to the HDD until empty, or else, most preferably, (2) the buffer memory is written or read (as the case may be) until the occurrence of an "end of file" condition—which normally means only that the present operation has completed, but can mean what a time-out has occurred, and/or that power has been lost. For example, when reading some selected MP3 tracks from the HDD of a music player/recorder, the buffer memory would be from time to time filled until a final buffer fill operation wherein the last selected track(s) is (are) retrieved, as is indicated by an "end of file" generated by the retrieving controller. As another example—and considering buffering data transfers in the opposite direction where data is logged to the disk drive—if a telephone a record of a complete telephone conversation transpired and (compressed and) stored in the buffer memory is desirous of being permanently stored, an "end of file" condition generated either when the telephone call ends (or thereafter by user selective activation). The generation of an "end of file" condition is common and well known in the digital recording and playing sciences, and is not even essential to the present invention. That is, the present invention works perfectly satisfactorily when the buffer memory is, as stated above, (1) filled only as and when emptied, and un-filled only as and when full—totally without any attention to any "end of file" condition(s). (When data is being buffered onto the HDD, it remains desirous, however, to dump the buffer memory onto the HDD in the event of power failure.) The preferred triggering of a buffer transfer to also transpire (2) upon the occurrence of an "end of file" simply serves to simplify operations like synchronization, and/or backup, of the data that is upon the HDD.

1.2 Preferred Size of the Buffer Memory

Having seen that the preferred (3) buffer management in accordance with the present invention is quite simple, so also is the preferred (2) sizing of the buffer memory for (1) the normal tasks and data of a particular device quite simple. The buffer memory is sized empirically in consideration of the actual usage of a real device so that, preferably, the duty cycle of the HDD is below twenty percent (20%), and is most preferably below ten percent (10%). Economics of the cost of solid state, normally semiconductor, memory circa 2004 relative to (1) the usage patterns of certain devices, namely portable MP3 music players, and (2) desire to prolong battery life, dictate that the HDD duty cycle may usefully and effectively be reduced to less than five percent (5%). The normal size of a solid state, buffer, memory to realize a HDD duty size of an MP3 player in normal use has been found to be of the order of only 32 to 64 MBytes—a trivial amount. A cellular telephone, especially as may incorporate a camera (a music playing capability being of much less significance) can typically benefit by a buffer memory size of from 64 to 128 MBytes, and more, in achieving a HDD duty cycle of less than 10%. Finally, a most demanding buffering operation is currently presented by a digital video recorder. A buffer memory size of from 124 to 512 MBytes is necessary depending upon detail application, resolution, etc., and some video cameras can benefit from a full Gigabyte of solid state, typically semi-conductor and most typically DRAM, memory.

It should by now be understood that when, in accordance with the present invention, a manufacturer puts a certain size buffer memory (to a certain size level, with any larger size being of diminished return) within a portable electronic device, this buffer memory translates directly into extended battery life (and, less visibly, reduced heat build up) for the device. Thus, unlike a computer where a buffer, wheresoever situated, typically contributes to speed of performance, the buffer memories of the present invention are substantially unconcerned with speed, or with function—devices not having these buffer memories functioning fully, and very nearly as fast, as devices not having the buffer memories—but are instead concerned with conserving energy, and reducing heat load.

2. Power Conservation in a Portable Electronic Device Through (1) Minimizing Data References to a Hard Disk Drive (HDD) by Use of a Large Data Buffer, (2) Eliminating Any Reference to the HDD for Instructions, and/or (3) Eliminating Any Microprocessor (In Performance of MP3 Encoding/Decoding)

The present invention realizing power conservation in the recording and playback of digital audio and video from a rotating disk drive can realize, most typically, about six times less power consumption, and six times longer battery life, than heretofore. In greater detail the present invention so functions to realize this energy savings as follows:

2.1 Simple On/Off Control of Rotating Devices

Rotating devices in the form of (i) CD-ROM drives, and, because of the greater inertial mass of the platter(s) of most disk drives of 10+Gbit capacity circa year 2004, (ii) Hard Disk Drives (HDDs), consume the most of the power in portable electronic equipments using the same, such as, by way of example, a portable CD-ROM and/or MP3 player/recorder. Needless to say, almost all modern CD-ROM and/or MP3 player/recorders shut down, or "OFF", these drives when they are not in use.

The way this works in the present invention is, however, specific to the functions performed. In accordance with the invention the 1) first digital words representative of audio-visual data, such as are, by example, retrieved from a spinning CD-ROM or from a camera, are marshalled, including with any encoding and/or compressing that needs be performed, while a rotating, typically a Winchester type, disk drive is stationary and idle. Namely, these encoded and/or compressed digital words are stored to a solid-state, normally semiconductor, memory—such as a memory of the DRAM (volatile) or FLASH (non-volatile) types. Only later when sufficient accumulation is derived is the Winchester disk spun up, and rotated so as to receive, and to store, the digital words from the solid-state memory, after which transfer disk rotation is un-powered, and stopped. This later data transfer normally happens very fast relative to the much longer time(s) of data accumulation. The entire cycle of (1) accumulation, (2) storage in the solid-state memory, and then (3) storage in the rotating, disk, memory, repeats over and over again. Thus the hard disk drive typically spends considerable time un-powered and stopped, thereby conserving power.

If, upon some later time, the data stored in the rotating hard disk drive is retrieved and used—which may require reverse conversion and/or de-compression—then the entire energy-saving process is continued, now in reverse order. Namely, a quantity of the stored digital data words are retrieved from the rotating, normally Winchester type, hard disk drive into the sold-state, typically semiconductor, memory in one continuous high-speed, burst, data transfer. The retrieved quantity of digital data words is normally so extensive so as to constitute a complete musical work, or many still pictures, or a video segment. However, the only important concept, and relationship, is that the retrieved audio-visual data will normally take much, much longer to be played to a human than is required to transfer it from the rotating hard disk drive to the sold-state, buffer, memory. Accordingly, the disk drive is again un-powered, and stopped, while the retrieved data is used, minimizing the "ON" duty cycle of the disk drive, and conserving power.

2.2 Details of a Data Buffer That Permits But Infrequent Powering of Rotating Devices By way of example, the present invention may be applied to a portable CD-ROM and MP3 player-recorder in order to greatly reduce, or even eliminate, necessary reference(s) to, and powered operational periods of, a Hard Disk Drive (HDD) within such a device.

In accordance with the present invention, a CD-ROM and/or MP3 player-recorder is possessed of a solid state, preferably semiconductor data buffer memory, most preferably of the FLASH or DRAM types. This semiconductor memory is most preferably about 32 to 64 MBytes in size. Data, most normally digital audio data, read from a CD-ROM is—whether re-encoded (as in the present invention) or not—buffered in the buffer memory before being periodically recorded on the HDD. Normally about 3-4 complete songs can be buffered in the buffer memory before being recorded on the HDD. (If the human operator of the CD-ROM and MP3 player-recorder decides in the interim that he/she does not wish to record one or more songs, then the energy to do so need never be expended). Likewise, during playback from the HDD some 3-4 songs will be uploaded to the buffer memory in and as a high-speed data stream of, typically, some several milliseconds, after which the HDD is powered down for, most typically, some minutes duration.

3. A Method of Conserving Power in and Electronic Device, and an Electronic Device So Conserving Power, During the Playing of Audio and/or Visual Data Accordingly, in one of its aspects the present invention is embodied, in a method of conserving power in and electronic device, and an electronic device so conserving power.

In the preferred method a disk storing digital data is rotated in order to concurrently first-read digital data from the disk into a buffer memory. When the buffer memory becomes filled the disk rotating and the first-reading is stopped. To the extent digital data exists within the buffer memory digital data is second-read from this buffer memory so that, concurrently with this second-reading, visual images are displayed and/or audible sounds are produced. This second-reading and concurrent displaying of visual images and/or producing of audible sounds transpires during intervals when the disk rotation is stopped because the buffer memory is filled from the rotating disk much faster than it is second-read.

In this power-conserving method the digital data within the rotating disk may optionally be encoded. In such a case a decoding step transpires relationally to earlier-performed steps of rotating and concurrent first-reading, and to later-performed steps of second-reading and concurrent displaying of visual images and/or producing of audible sounds. In one variant this decoding of the encoded digital data read from the rotating disk transpires concurrently with the first-reading, making that the encoded digital data first-read from the rotating disk is decoded before being placed into the buffer memory. In another variant this decoding of the encoded digital data read from the rotating disk transpires concurrently with the second-reading and the displaying of visual images and/or producing of audible sounds, making that the encoded digital data first-read from the rotating disk is decoded only upon being second-read from the buffer memory.

The digital data within the rotating disk is preferably encoded in accordance with any of version of the MPEG standards, or the MP3, WWA, MP-Pro, AAC, DIVX, DVD, SADC, Super CD, or QOOS standards.

In the power-conserving method the disk rotating and concurrent first-reading preferably continue until the buffer memory is filled or all desired files are retrieved, whichever comes first. Normally this will entail the reading of data from the HDD sufficient to display several visual images and/or produce several audible sounds.

This method of the present invention is may be extended to use in an electronic device also writing digital data representing visual images and/or audible sounds to the rotating disk storing digital data. Such an extended method further includes digitally encoding in real time digital data representing visual images and/or audible sounds, and, concurrently, first-writing in real time the encoded digital data to a buffer memory store until at least so much digitally-encoded data has been written as represents a complete visual image and/or a contiguous segment of sound without detectable pauses. The disk is then rotated while concurrently second-writing digital data from the buffer memory into the rotating disk.

This rotation of the disk is stopped upon at least some times while the digitally encoding and the concurrent first-writing are ensuing.

In this extended power-conserving method the first-writing preferably continues until the buffer memory is emptied or all desired files are written to the disk, whichever comes first. As with the reading of data from the HDD, this writing of data to the HDD normally entails data sufficient in amount to display several visual images and/or produce several audible sounds.

Both the basic, and the extended, power-conserving methods may in particular be advantageously applied to an electronic device that is portable.

For example, a preferred embodiment of such a portable electronic device would include (1) a rotating disk storing a relatively larger amount of digital data representing images and/or sounds, the rotating disk spinning up, rotating in order to read digital data, and then stopping, (2) a solid state memory storing a relatively smaller amount of digital data representing images and/or sounds, and (3) a player producing visually perceptible images and/or audibly perceptible sounds from digital data read from the solid state memory store. A controller causes (1) the rotating disk to rotate so as to progressively read a block of the digital data to the solid state memory during a first time interval, and also (2) causes the player to produce the visually perceptible images and/or audibly perceptible sounds from the same block of digital data as it is progressively read from the solid state memory during a second time interval. Because the second time interval is longer than is the first time interval, the rotating disk will stop between reading successive blocks of digital data to the solid state memory. The solid state memory clearly serves as a buffer memory to the reading of the rotating disk. Energy is conserved in the rotating disk because it is stopped between reading successive blocks of digital data.

In the most preferred portable electronic device the first time interval is commonly partially overlapped with the second time interval, but need not be so overlapped.

4. A Method of Conserving Power in an Electronic Device Writing Digital Data Representing Visual Images and/or Audible Sounds, and a Device So Functioning In the first of its aspects in section 3, above, the present invention was explained to conserve power in the reading of a drive, preferably (but not necessarily) a Winchester-type hard disk drive (for example, a CD-RW drive may also be used). In another of its aspects the present invention is embodied in a method, and in devices, for the conservation of power during the writing of a, or even the same, disk drive. Again, the disk drive is preferably, but not necessarily, a Winchester-type hard disk drive as, for example, a CD-RW drive may also be used.

In a most preferred method of conserving power in an electronic device writing digital data representing visual images and/or audible sounds to a rotating disk storing digital data, the method commences with steps of (1) digitally encoding in real time digital data representing visual images and/or audible sounds, and concurrently (2) first-writing in real time this encoded digital data to a buffer memory store until at least so much encoded digital data has been written as represents a complete visual image and/or a contiguous segment of sound without detectable pauses. The method then continues with (3) rotating a disk while, concurrently with the rotating, (4) second-writing digital data from the buffer memory into the rotating disk. The rotation of the rotating disk is stopped upon at least some times while the digitally encoding and concurrent first-writing are both ensuing because the second writing is much faster than the first writing.

Optionally in this power-conserving method, and along with the digitally encoding and concurrent first-writing, the method further includes compressing the digital data first-written within the buffer memory store. This compressed digital data is first-written to the buffer memory store, thus making that the compressed digital data is also second-written to the rotating disk.

As the power-conserving-during-reading first-aspect method of the present invention was extendable to power conserving during writing, so as may the present power-conserving-during-writing second-aspect method of the present invention be extended to power conserving during reading. Namely, in the extended method a disk is rotated to concurrently first-read digital data from the rotating disk into a buffer memory; and, to the extent digital data then exists within the buffer memory, this digital data is second-read from the buffer memory to display visual images and/or produce audible sounds. This second-reading again transpires upon at least some times when the rotating disk is stopped.

Also as before, the second-aspect method of the present invention is applicable to an electronic device that is portable.

And still further as before, a portable electronic device uses, and embodies, this second-aspect method of the invention. Namely, in such a portable electronic device a rotating disk stores a relatively larger amount of digital data representing images and/or sounds. This rotating disk spins up, rotates in order to write digital data, and then stops. A solid state memory stores a relatively smaller amount of digital data representing images and/or sounds. Finally, there exists a source of digital data representing images and/or sounds (for example, a microphone, or a CCD camera). A controller causes (1) the source of digital data to store the digital data representing images and/or sounds within the solid state memory during a first time interval, and from time to time also (2) causes the disk to rotate so that a block of digital data progressively read from the solid state memory may be progressively stored upon the disk during a second time interval.

The second time interval is shorter and typically much, much shorter than is the first time interval. Thus the rotating disk will stop between writing successive blocks of digital data from the solid state memory. The solid state memory thus again clearly serves as a buffer memory—this time to the writing of the rotating disk. Energy is again conserved in the rotating disk because it is stopped between writing successive blocks of digital data.

Still further in the preferred embodiment of this portable electronic device according to the present invention, the first time interval is optionally, and preferably, partially overlapped with the second time interval.

5. A Method of Conserving Power in a Digital Telephone

In still yet another, particularized, one of its several aspects, the present invention is embodied in a method of conserving power in a digital telephone, and also in a telephone device using this method.

In the preferred method audio information from the sound environment of the telephone is digitally encoded. At least so much digitally-encoded audio information as represents a contiguous segment of sound, without detectable pauses, is stored in a buffer memory. A read-writable disk memory is spun up, and then the digital audio contents of the buffer memory to are written to the disk memory, with the rotating disk subsequently being powered down, even so far as to come to a stop.

By this operation the disk is not continuously rotating during all of the digitally encoding and the storing, and thus saves power.

The telephone may optionally have a camera. In this case the digital encoding is of audio information plus a digital picture. The storing in the buffer memory is then of at least so much audio and picture information as represents (1) one complete sound clip and associated picture, or (2) video clip. The spinning up a read-writable disk memory is then followed by writing the digital audio and picture contents of the buffer memory to the disk memory, at which time the disk is powered down. Again the disk is not continuously rotating during all of the digitally encoding and the storing, and thus saves power.

In yet another variant of a power-conserving digital telephone in accordance with the present invention, a digital encoder of audio information from the sound environment of the telephone produces digitally-encoded audio information. A buffer memory stores at least so much digitally-encoded audio information as represents a contiguous segment of sound, without detectable pauses. A read-writable rotating disk stores multiple contiguous segments of sounds, this rotating disk spinning up, rotating in order to be written with digital data, and then stopping. Finally, a controller causes (1) the digital encoder to store the digital data representing audio within the solid state memory during a first time interval, and also (2) the disk to rotate so that a block of digital data that is progressively read from the solid state memory will be progressively stored upon the disk during a second time interval.

The second time interval is shorter than is the first time interval, making that the rotating disk will become unpowered, and will even stop, between writing successive blocks of digital data from the solid state memory. The solid state memory thus serves as a buffer memory to the writing of the rotating disk. Energy is clearly conserved in the rotating disk because it is stopped between writing successive blocks of digital data.

As before, the first time interval is preferably partially overlapped with the second time interval.

In application of the present invention to telephones, both the method of the invention, and the device (the telephone) using the method, may be approached not from power conservation transpiring during the writing of the hard disk drive, as above, but rather, and alternatively, from the energy conservation occurring upon the reading of the telephone's hard disk drive. See previous section 4.

6. A Method of Conserving Power in a Digital Camera, or Video Camera, and Digital Cameras and Video Cameras Using the Method In still yet another, further particularized, one of its several aspects the present invention is embodied in a method of conserving power in digital cameras or video cameras, and in a digital cameras and digital cameras using this method.

In a preferred method of the present invention for conserving power in a digital camera, the method includes (1) digitally encoding information from the environment of the digital camera, (2) storing in a buffer memory at least so much digitally-encoded environmental information as represents a contiguous segment of video and/or audio, without detectable scene breaks or pauses, and, from time to time, (3) spinning up a read-writable disk memory, writing the digitally-encoded environmental information contents of the buffer memory to the disk memory, and powering down the disk. By these steps the disk is not continuously rotating during all of the digitally encoding and the storing, and thus saves power.

In application of this method to a digital still camera, the (1) digitally encoding of information from the environment of the camera constitutes a digital picture, and the (2) storing in the buffer memory is of at least so much digitally-encoded environmental information as represents one complete such picture.

Alternatively, when this method is applied to a digital video camera, the (1) digitally encoding information from the environment of the camera constitutes a digital video clip, and the (2) storing in the buffer memory is of at least so much digital video information as represents one continuous such video clip.

The method of conserving power may even be extended to a digital video camera with sound capability. The (1) digitally encoding information from the environment of the camera is then digital video and audio, and the (2) storing in the buffer memory is of at least so much digital video and audio information as represents one continuous video clip, without scene breaks or audio gaps.

7. A Method of Conserving Power in a Digital Video Player, and Digital Video Players Using the Method In still yet another, further particularized, one of its several aspects the present invention is embodied in a method of conserving power in a digital video player, and in a digital video players using this method.

In the preferred method a readable digital disk memory of a digital video player is spun up and rotated. Digital video information read from the disk is written to a non-rotating buffer memory. The rotation of the digital disk memory is ceased while video from the digital video information stored within and read from the non-rotating buffer memory is displayed.

In this method the digital video information read from the readable digital disk memory is preferably compressed. In such as case between, as first-performed steps, the spinning up and rotating and the writing, and, as last performed steps, the ceasing rotation and the displaying, the method will then further include decompressing the digital video information read from the readable digital disk memory.

8. Application of the Present Invention is Not Limited by the Types of Information Buffered The energy-saving buffering or the present invention is good for many more purposes, and many more types of information, within portable digital devices then simply digital musical works and pictures and video clips. Indeed, as the information manipulation capacity of the digital device becomes larger and larger—it having been announced the very month of the filing of this specification that some digital cell phones will use the Linux operating system as was heretofore reserved for computers—the importance of buffering information to and from the device's hard drive may become more and more important.

For example, in a digital, and normally a wireless telephone (which may or may not be a cellular telephone) having a hard disk drive, at least the following types of information may usefully be buffered in accordance with the system of the present invention. The (audible) telephone call itself may be buffered onto the hard disk drive—even retrospectively, and after the call has ended. More fundamentally, it will likely be or become useful to keep a complete call history and log, recording who called who when and how long. The hard disk drive may contain a backup of the telephones address books and other control parameterization, partially completed games, ringtones, and even material—which may be quite voluminous—from the Internet, particularly including instant messages, e-mail and even web pages as are obtained with a browser.

Some small amount of thought will reveal that as this now-emerging electronic device—which is still called a "telephone"—is in the future used in accordance with its many and immensely versatile capabilities, it will no more be able to hold all its data, or even its entire operating system, in semiconductor memory than does a current personal computer. During task switching, and even multi-tasking, the "telephone" must, and clearly will, interchange voluminous information between its operating memory and its hard disk drive. These frequent interchanges serve as a broader motivation for the present invention than the mere conservation of battery life in an MP3 player—useful as that may be to the owner of such a device which will in the future be likely be considered as uni-functional, poorly communicatively connected, and downright primitive.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

Figure 1:
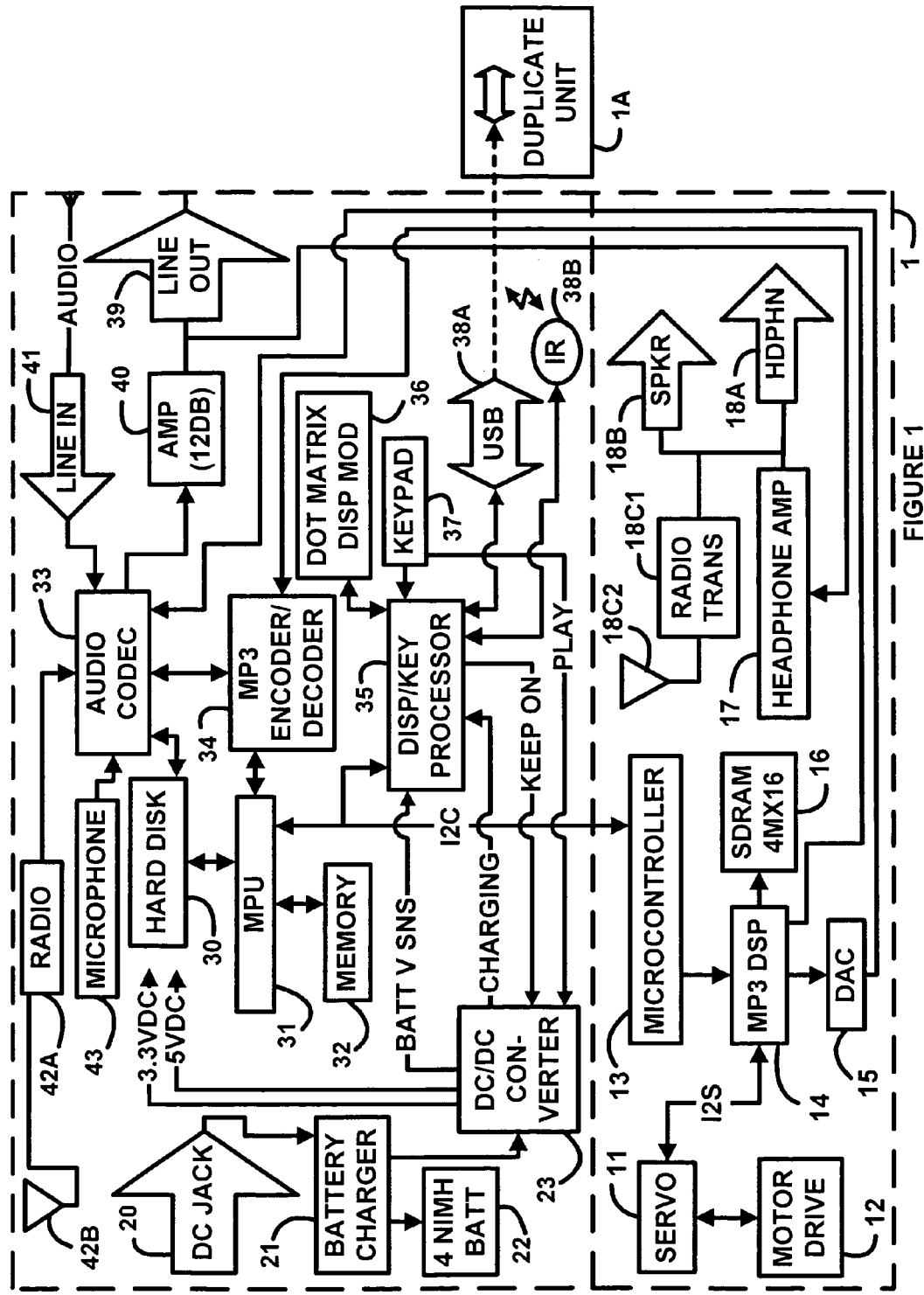
FIG. 1 is a schematic diagram of the preferred embodiment of a portable combination CD/ROM and MP3 recorder-player in accordance with the present invention.

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

The music and audio recorder/player system, or device, in which the present inventions are embodied incorporates (i) a CD Drive, (ii) a Hard Disk Drive (HDD) storage device, (iii) a high-speed volatile semiconductor memory, and (iv) a user interface.

In use a human operator takes a standard audio CD and inserts it into a standard CD reader only device. Through this device the operator using the operating interface selects either one song, or all songs, to be played from the CD. After song selection the songs are played—which, in a manner opaque to the user, involves decoding the ISO standard digital code words of the CD, and producing an analog wave form that is transduced into audible sound—concurrently that the songs are ultimately stored to a Hard Disk Drive (HDD). Also opaque to the user, this storage involves (i) compressing the analog wave from into MP3 format code words, (ii) storing these code words in a buffer memory, and then, when most typically several songs have been stored in the buffer, (iii) writing all, or such of the songs as are then selected, to the HDD.

Accordingly, when the user-operator wishes to hear a song, then he/she chooses the song from an operator interface play list. After the song is chosen the song file is uploaded to a volatile solid-state memory, and since this memory is solid state the song file may be played with no interference from any vibration. The playing of the song from the CD involves converting it from a digital format to an analog signal, and sending the analog signal to an audio preamplifier and, ultimately, to speakers or to headphones. The operator has a choice when first selecting songs from the CD to either download to the hard drive in real-time (while the song is playing) or at a speed of 5 to 1 with no audio playback. Operation of the recorder/player device does not require any presence, or operational knowledge, of a personal computer, the device operating essentially the same as a standard audio CD player.

1. User Interface and Logic Control Circuit

Control of the components is achieved through a proprietary logic control and user interface that provides access to the "keyboard" and "display" functions of the "Car-Tunes" audio player. This system incorporates a main menu/sub-menu structure.

The Main Menu Selections are: 1) Play, 2) Record, 3) Favorites, 4) Radio, and 5) Sound. Selection among these alternatives preferably gives rise to 1) an associated alphanumeric display of at least 2 lines, plus 2) an indication that "time" can be selected, and incremented/decremented, by user manipulation of a physically proximate associated front panel button/control, plus 3) an indication that "sub-commands" can be selected, and entered, by user manipulation of another physically proximate and associated front panel button/control, and 4) an indication that the other selections 1)–3) can be "locked", and acted upon, by user manipulation of yet another physically proximate and associated front panel button/control. In simplest terms, selection from the main menu does no more than adapt the user interface to prompt the user to select, and to make, still further control inputs.

For example, the preferred "time" sub-menu displays "?-/+?", with obvious effect upon user manipulation.

For example the preferred "lock" sub-menu displays "?/? Store", with obvious consequences should the user activate the corresponding button/control/

By far the most complex sub-menu is that for commands. Should 1) Play be selected on the main menu, then the Play commands sub-menu then appearing will preferably show a series of alternatives: Play ?, Stop |, Fast Fwd >, Reverse <, Track Forward >>, Track Back <<, and Pause #.

Should 3) Favorites be selected on the main menu, then the Record commands sub-menu then appearing will preferably show a series of alternatives: Deejay random play, Play-List, Last, Add, and Delete.

Similarly, should 4) Radio be selected on the main menu, then the Radio commands sub-menu then appearing will preferably show a series of alternatives: AM, FM, Tune –/+ with sub-sub-menus Scan </> and Seek <</>>, and Memory with sub-sub-menus Add + and Del Finally, should 5) Sound be selected on the main menu, then the Sound commands sub-menu then appearing will preferably show a series of alternatives: EQ equalizer, Bass –/+, Treble –/+, Balance –/+, Fader –/+, and Memory.

2. Preferred Embodiment of a Portable Combination CD/ROM and MP3 Recorder-player in Accordance with the Present Invention FIG. 1 is a schematic diagram of the preferred embodiment of a portable combination CD/ROM and MP3 recorder-player in accordance with the present invention.

The elements of the recorder-player below the horizontal dashed line are substantially pre-existing and conventional; the added elements of the present invention are substantially shown above the horizontal dashed line. Below the horizontal dashed line a Motor Driver 12, preferably type MM1538 or FAN8038, powers rotation of a CD-ROM (not shown) so that a Servo 11, preferably type CXA2550, CXD3068 OPU (KSM900), under control of a Micro-controller 13, will deliver, during rotation of the CD/ROM digital data in the form of ISO CD/ROM code words to the digital signal processor MP3 DSP 14, preferably type RSM88131A or TR2101. The entire CD mechanism may be, for example, Sanyo type DA23.

The digital data from the CD/ROM is buffered in a memory SD RAM 16, preferably of size 4M words of 16 bits each (NOTE: this buffer memory should not be confused with the buffer Memory 32). Decoded digital data—representing an audio wave form—from the MP3 DSP goes to audio digital-to-analog converter DAC 15, preferably type WM8725 or AK4352, and also to MP3 Encoder/Decoder 34 which is a new chip from Yountel of Korea further discussed elsewhere in this specification.

Meanwhile, an audio signal from the DAC 15 goes to audio companding de-companding circuit Audio CODEC 33.

The elements added to this base structure of a CD/ROM reader in order to realize the combination CD/ROM and MP3 recorder-player in accordance with the present invention are next introduced in the context of the functions that, at various times and under various user/operator control, that these elements serve to perform. One function, and operational mode, of the combination CD/ROM and MP3 recorder-player is called "analog play, and record from analog". The paths, and the related elements, primary in this operation are high-lighted in darkened line in FIG. 2a. The audio signal from the DAC 15 received in Audio CODEC 33 is directly routed to Amplifier 40 of nominal 12 db gain, and then to Headphone Amp 17, and then for play to any of (i) Headphone 18a, and/or (ii) Speaker 18c1, and/or (iii) through Radio Transmitter 18d1 and antenna 18d2 via a low power radio signal (preferably FM) to a proximate radio (not shown) for reception and play through the sound output system of the radio. Meanwhile this audio signal is also passed through the Audio CODEC 33 to the MP3 Encoder/Decoder 34 where it is encoded to MP3 code, preferably at a 24 bit code word bit length.

The MP3 encoded data is passed though the file management unit MPU 31—a custom chip for which may be substituted for purposes of the present invention a microprocessor—first to the buffer Memory 32, which is preferably of the FLASH or DRAM types. When the buffer Memory 32, which is preferably 64K or larger in size, becomes filled, then its contents (such as are then selected for permanent recording) are moved en masse through and by the MPU 31 to the Hard Disk 30, which is preferably of the Winchester type, and is more preferably a magnetic disk of 10 Gigabytes or greater capacity.

At the conclusion of the "analog play, and record from analog" operation, the audio CD/ROM has been played, and MP3 encoded data in respect of the contents thereof the CD/ROM lodged on the Hard Disk 30.

Another, similar, function, and operational mode, of the combination CD/ROM and MP3 recorder-player is called "digital play, and record from digital". The paths, and the related elements, primary in this operation are high-lighted in darkened line in FIG. 2b. The digital signal (reflective of an analog audio wave form) from the MP3 DSP 14 bypasses Audio CODEC 33 and is sent to MP3 Encoder/Decoder 34. The decoding of this signal to analog audio is sent to the Audio CODEC 33 and then to the Amplifier 40 and so on, meaning to the Headphone Amp 17, and then for play to any of (i) Headphone 18a, and/or (ii) Speaker 18c1, and/or (iii) through Radio Transmitter 18d1 and antenna 18d2 via a low power radio signal (preferably FM) to a proximate radio (not shown) for reception and play through the sound output system of the radio.

Meanwhile the MP3 encoded data from the MP3 Encoder/Decoder is sent to the MPU 31 where it essentially undergoes the same treatment as it was previously. Namely, it is passed first to the buffer Memory 32 and then, when the buffer Memory 32 becomes filled, the MP3 data is moved en masse through and by the MPU 31 to the Hard Disk 30, where it is stored.

Accordingly, at the conclusion of the "digital play, and record from digital" operation, the audio CD/ROM has again been played, and MP3 encoded data in respect of the contents thereof the CD/ROM has again become lodged on the Hard Disk 30.

Figure 2A:
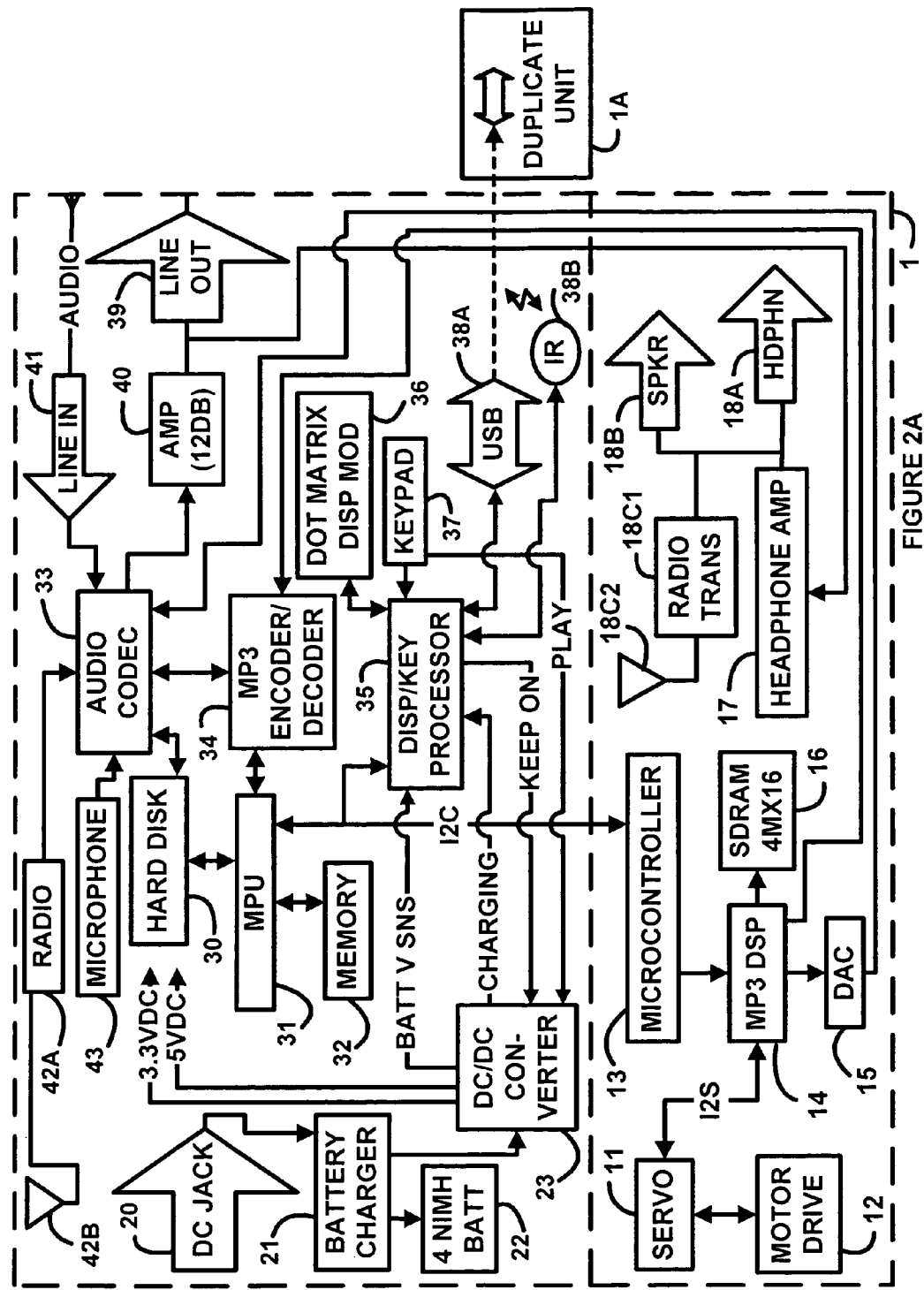
FIG. 2a is the schematic diagram of the preferred embodiment of a portable combination CD/ROM and MP3 recorder-player in accordance with the present invention previously seen in FIG. 1 marked so as to highlight certain paths involved in the "analog play, and record from analog" operational mode of the player-recorder.
Figure 2B:
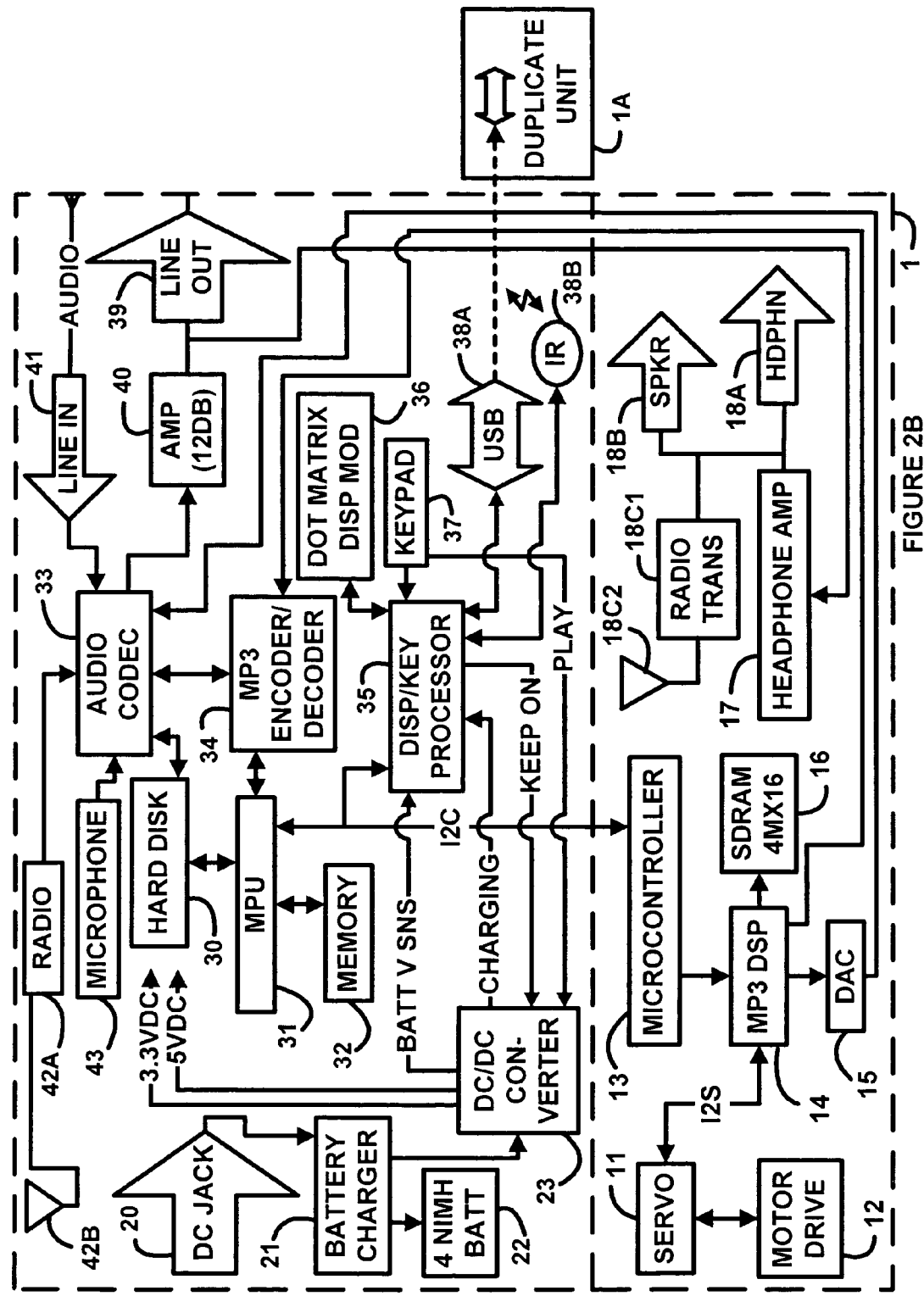
FIG. 2b is the schematic diagram of the preferred embodiment of a portable combination CD/ROM and MP3 recorder-player in accordance with the present invention previously seen in FIG. 1 marked so as to highlight certain paths involved in the "digital lay, and record from digital" operational mode of the player-recorder.

Both the "analog play, and record from analog" operational mode illustrated in FIG. 2*a*, and, more preferably, the "digital play, and record from digital" operational mode illustrated in FIG. 2*b* can be replicated in a "Program" mode where (i) audio play is disabled and, as a consequence that the information ultimately retrieved from the CD/ROM need not be played in real time, (ii) the entire process of MP3 encoding and storage may be run faster, essentially as fast as the weakest link in the chain of reads, decodes and/or conversions, and writes will run. Normally the weakest link is the CD/ROM, which is then spun at 4× to 6× normal speed. Because of settling time in the de-companding circuits of the CODEC 33, it is preferred that the MP3 encoded data be developed in and by the "record from digital" operational mode.

Figure 3:
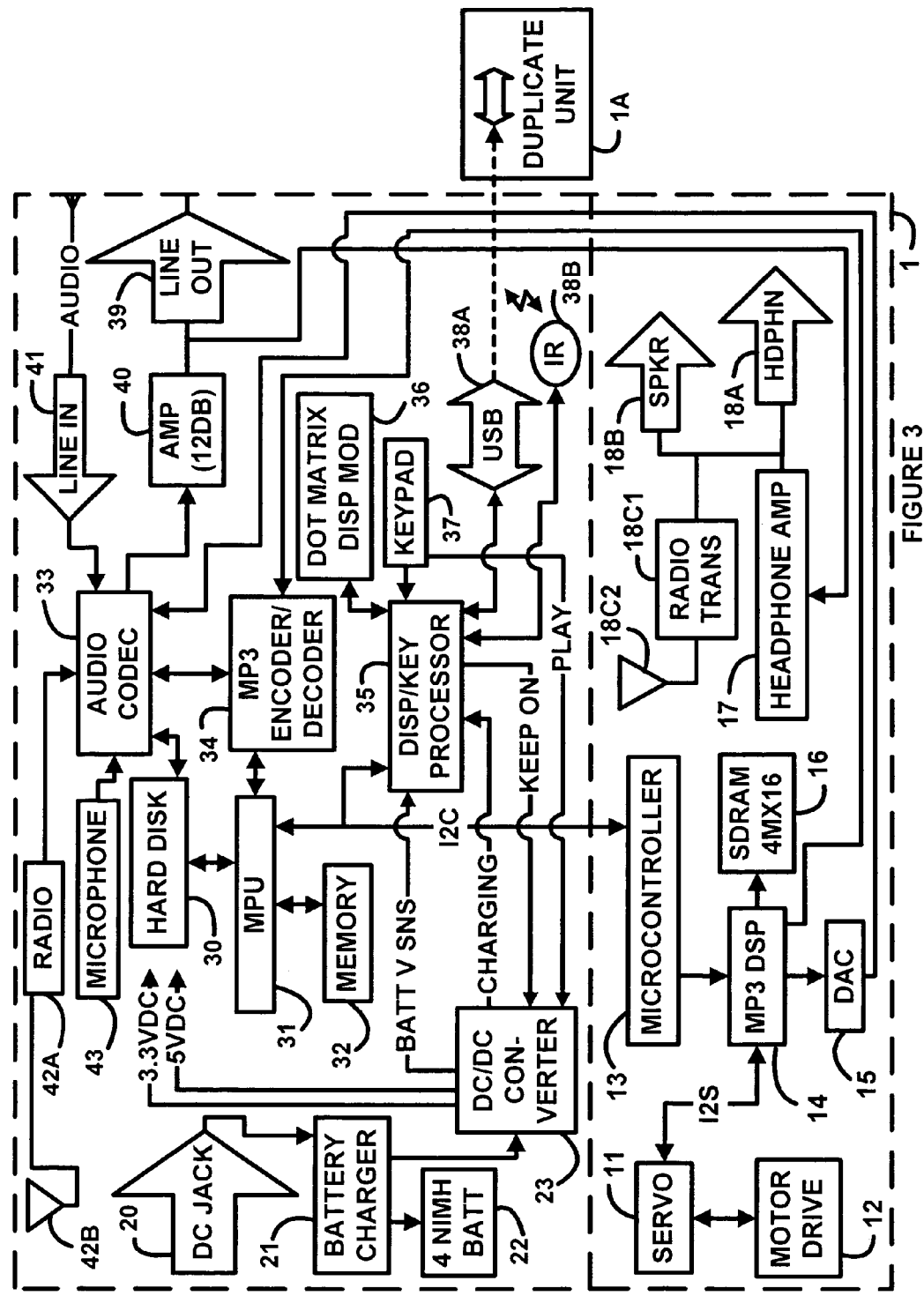
FIG. 3 is the schematic diagram of the preferred embodiment of a portable combination CD/ROM and MP3 recorder-player in accordance with the present invention previously seen in FIG. 1 marked so as to highlight certain paths involved in the "playback of MP3 from the hard disk" operational mode of the player-recorder.

The entire purpose of logging MP3 data to the Hard Disk 30 has been, or course, to provide for later retrieval and play. The path for so doing is high-lighted in FIG. 3, which is the same schematic diagram of the preferred embodiment of a portable combination CD/ROM and MP3 recorder-player in accordance with the present invention previously seen in FIG. 1 now marked so as to highlight certain paths involved in the "playback MP3 from hard disk" operational mode of the player-recorder. During playback the MP3 data from the Hard Disk 30 is extracted to, through, and by the MPU 31 to the buffer Memory 32. The MPU 31 also serves to issue successive MP3-encoded data words to the MP3 Encoder/Decoder 34 now acting as an MP3 decoder. The MP3 data decoded to a companded and encoded audio signal is sent to the Audio CODEC 33 where it is de-companded and further decoded to produce the pure audio signal sent to the Amplifier 40. As is by now understood, the path of the audio signal from the Amplifier 40 ultimately permits that it is transduced to sound in, by way of example, Headphone 18*a*.

Figure 4:
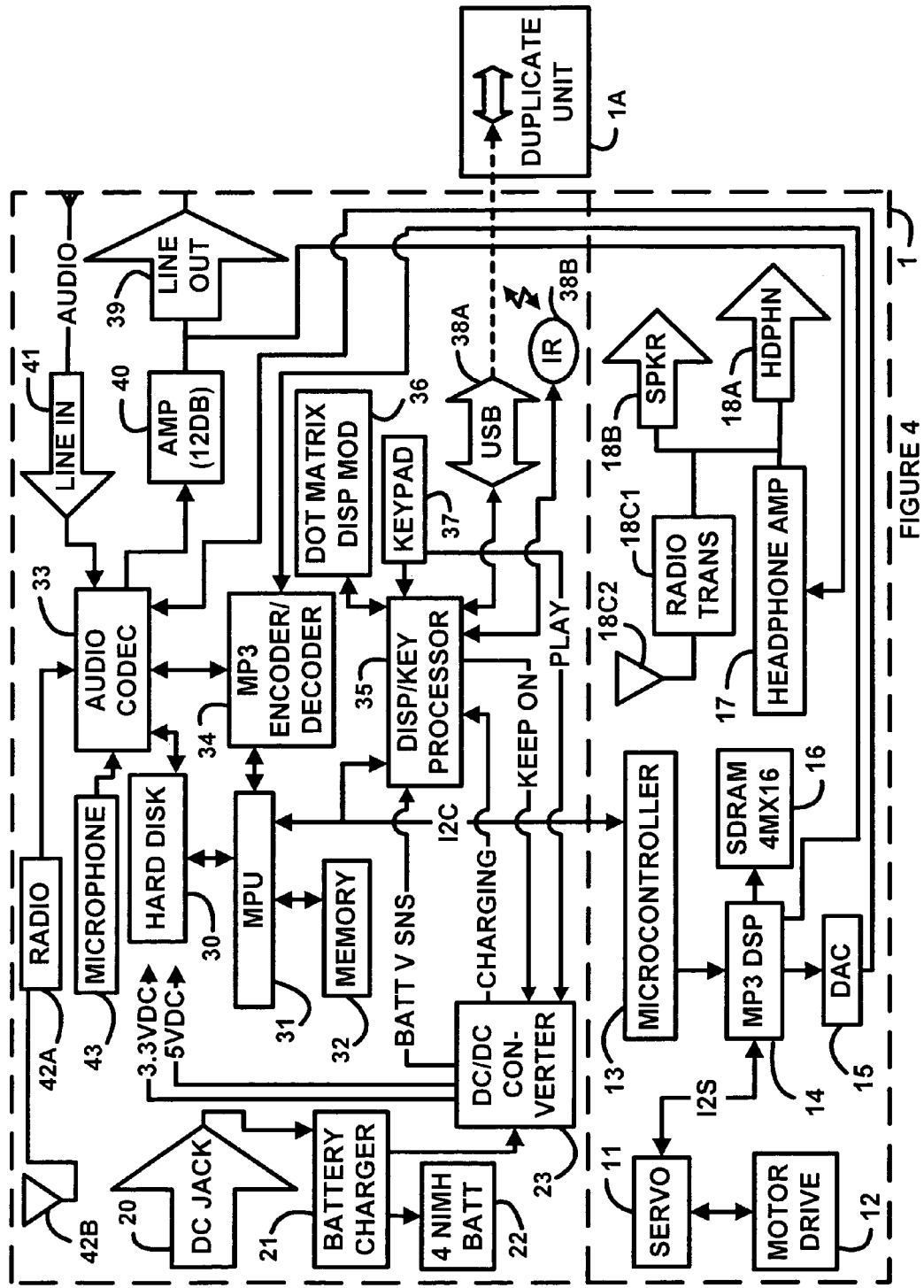
FIG. 4 is the schematic diagram of the preferred embodiment of a portable combination CD/ROM and MP3 recorder-player in accordance with the present invention previously seen in FIG. 1 marked so as to highlight certain paths involved in the "program mode MP3 data interchange" operational mode of the player-recorder.

The portable combination CD/ROM and MP3 recorder-player in accordance with the present invention may transfer MP3 data to a like unit—normally over a code-word or otherwise protected proprietary transfer-level-protocol-protected interface—to an identical, or like, unit. The path for so doing is highlighted in FIG. 4. MP3 data from the Hard Disk 30 is transferred by action of MPU 31 to be buffered in buffer Memory 32 and then, as called for by Display/Keyboard Processor 35—which manages the Universal Serial Bus 38*a*, or the Infrared Transceiver 38*b* for purposes of data transfer to the other device—to the Display/Keyboard Processor 35 and to the Duplicate Unit 1*a* over, by way of example, a Universal Serial Bus 38*a* or an Infrared Transceiver 38*b*.

Needless to say, this transfer can be very fast, up to 10 Mbits/second. Accordingly large numbers of tracks of musical works which are stored in MP3 (or related) compressed format on the Hard Drive 30 of one unit may be transferred (i) in gross, (ii) in accordance with a "transfer list" analogous to a "play list", (iv) as differing in title, or (v) track by track under user control, to the Hard Drive 30 of the other unit. The transfer mode (iv) is especially powerful, permitting a user/operator/owner with a virgin Hard Drive but access to another fully populated CD/ROM and MP3 recorder-player in accordance with the present invention (such as might be owned by a friend) to load large numbers of musical works, typically up to the approximately 1200 that will fit within a 10 Gbit disk storage, to his/her unit in mere minutes.

Additional elements shown in the schematics of FIGS. 1-4 will be substantially self-explanatory to a practitioner of the electronic music system design arts. Power is normally supplied through three separate options: 1) 110-220 volt a.c input, 2) a battery jack, or 3) batteries. Inputs to the Audio CODEC 33, and associated operational modes, are provided to digitalize (to MP3 format) and record audio information both from a Radio 42*a* (using an antenna 42*b*) and a Microphone 43. The Keyboard/Keypad Processor 35 manages the power selection and control, and the operator interface via the Keypad 37 and the Dot Matrix Display Module 36. An output port for the audio signal is provided through plug jack Line Out 39.

2. The Preferred MP3 Encoder/Decoder

The MP3 Encoder/Decoder 34 is type YMPC-3001 made by Yountel corporation of Korea, appearing on the World Wide Web at www.yountel.com <http://www.yountel.com>, supported by technology of the Control and Measure Engineering Department of Young KANGWON University, Korea.

The MP3 Encoder/Decoder 34 produces MP3 encoding at 24 bits, and decodes MP3 codes up to 24 bits. It can encode analog sound to an MP3 file in real time. It has the same sampling frequency as a CD (i.e., 44.1 KHz) with 24-bit grade-level Digital Signal Processing (DSP) core heretofore this chip believed by the manufacturer thereof (i.e., Yountel) to have been realized only at the laboratory level, and never in a commercial product.

The YMPC-3001 has 3.3 V digital circuitry; a serial audio interface in the ESAI standard; a MICOM Interface; and a byte-wide parallel host interface. The power consumption is 85 mA for encoding (nominal mode) and 40 mA for decoding (nominal mode), with a dowered down consumption of <100 uA in Stop Mode. The chip control accepts a Sync Recording ON/OFF signal. The chip is basically a 24-bit high-performance digital signal processor built into a 144-pin plastic TQFP package.

The decoding capabilities of the YMPC-3001 include MPEG 1 Layer 3 and MPEG 2 Layer 3 bit streams, 24-bit D/A Convertor adopted. For bitstream decoding, the bitstreams can be transmitted from Flash memory, smart card or other physical devices. Digital equalization may be selected from among classical, jazz, pop, rock, and techno-digital bass settings.

The decoding capabilities of the YMPC-3001 are based on a 24-bit, 44.1 Khz sampling A/D Convertor adopted to accept an analog audio input signal with the digital output code words being stored to and in a Flash memory or smart card of the like. During use for voice recording the MP3 format is used with a fs=16 Khz Mono /16 KBps.

Optional functions available for the YMPC-3001 include a USB interface, an ECP interface, digital input(s), a Smart Card interface, and a Flash media interface.

Figure 5:
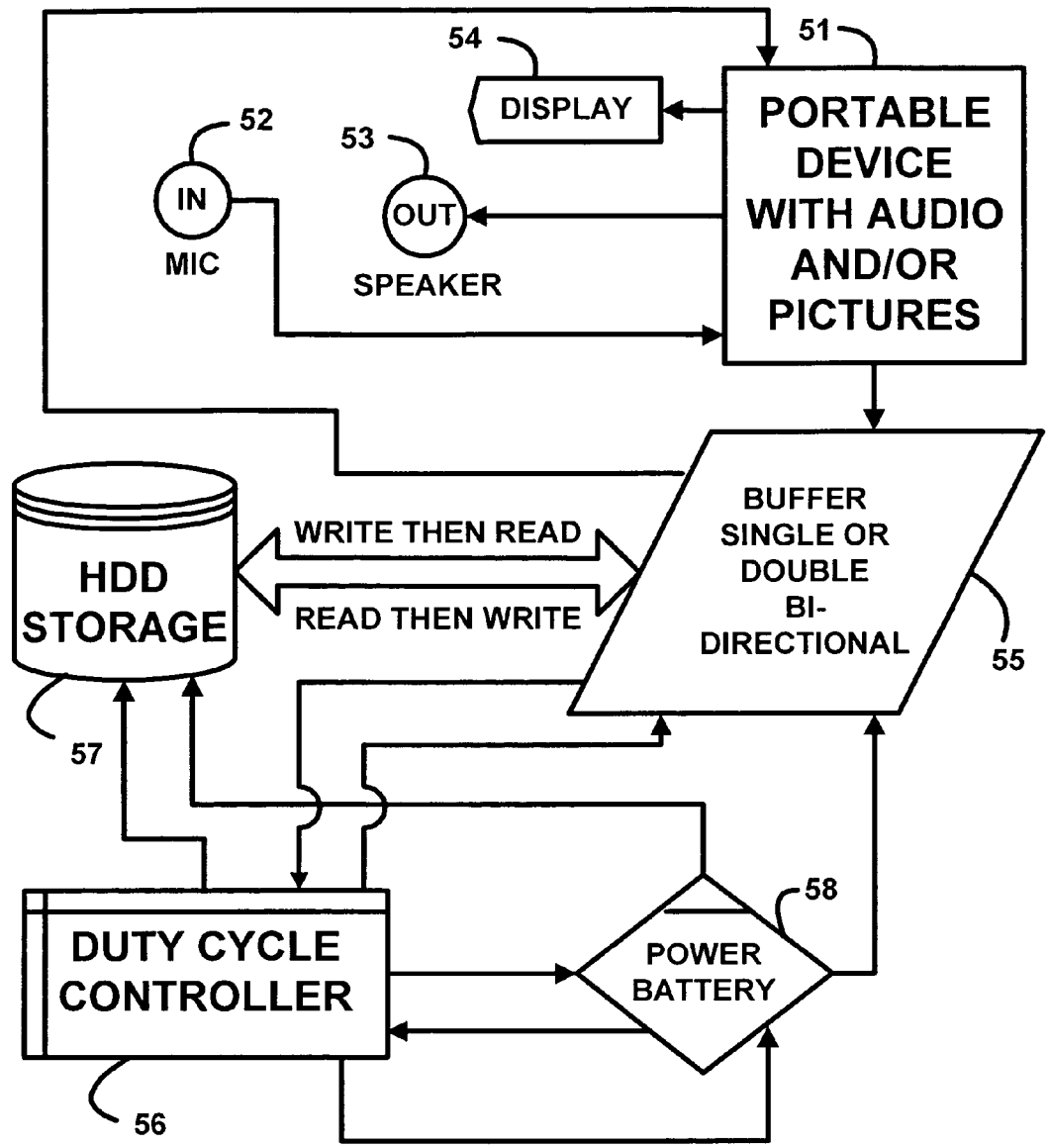
FIG. 5 is a block diagram of a preferred embodiment of a portable device with audio and/or pictures in accordance with the present invention.

3. Power-saving Buffering in Electronic Devices, Including Portable Recorder/Players and Telephones A block diagram of a preferred embodiment of a portable device with audio and/or pictures in accordance with the present invention is shown in FIG. 5. A2 receives input from, by way of example, a microphone 52, and provides outputs to, also by way of example, a speaker 53 and a display 54. A solid state, normally semiconductor, buffer (single or double bi-directional) 55 and managed by duty cycle controller 56 to read and write data to and from the hard disk drive HDD storage 57. All sections are powered from power battery 58.

In accordance with the present invention, the contents of buffer 55 are written to HDD storage 57 when the buffer 55 is (1) full, (2) upon occurrence of an "end of file" condition from the portable device with audio and/or pictures 51, and/or (3) in the event of an incipient power outage, normally also determined by the portable device with audio and/or pictures 51. Likewise in accordance with the present invention, the buffer 55 is filled with data read from the HDD 57 when it is (1) empty, (2) upon occurrence of an "end of file" condition from records being retrieved from the HDD 57 in conjunction with another "end of file" condition from the portable device with audio and/or pictures 51—meaning simply that the last file/record of the directed retrieval has now been retrieved—, and/or (3) in the event of an incipient power outage, again also determined by the portable device with audio and/or pictures 51. To a practitioner of the digital arts familiar with the much more difficult management of a buffer to a computer microprocessor, the management of the buffer 55 is straightforward in accordance that the records handled are themselves all only but simple audio and/or picture files (with possible accompanying identification numerals and/or text). In other words, there is no special procedure in the management of buffer 55 for file corruption, nor early termination, nor absence, etc., etc. What can be read from (or written to) the HDD storage 57 is so read (or written), and anything else simply does not appear within (or is off-loaded from) the buffer 55 for subsequent playing (or for recording).

Figure 6:
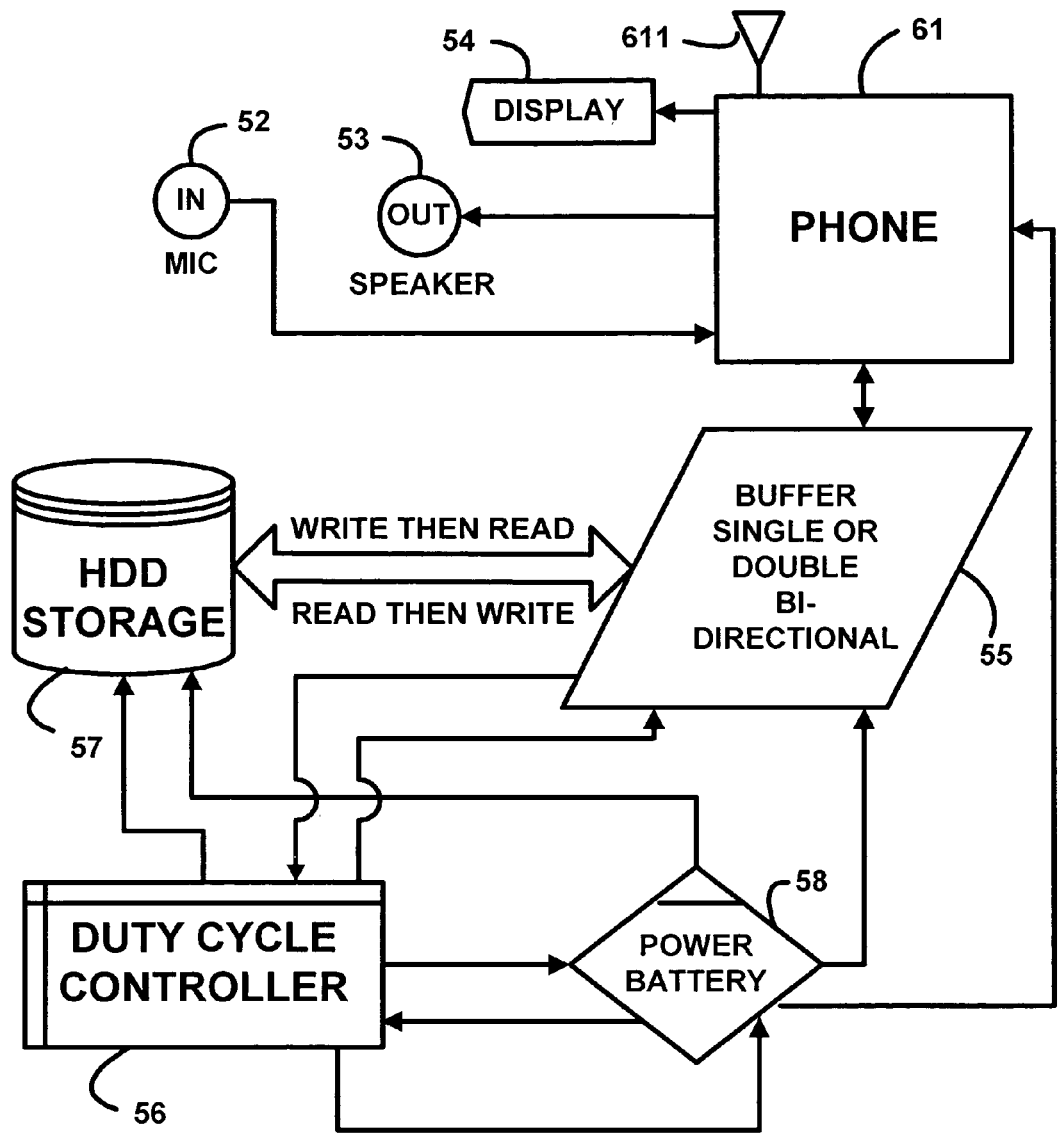
FIG. 6 is a block diagram of a preferred embodiment of a phone in accordance with the present invention.

A block diagram of a preferred embodiment of a phone in accordance with the present invention is shown in FIG. 6. The phone 61, which may optionally be wireless by radio connection 611 (wireless does not imply cellular) is connected similarly to, and functions like, the portable device with audio and/or pictures 51 just seen in FIG. 5.

Figure 7:
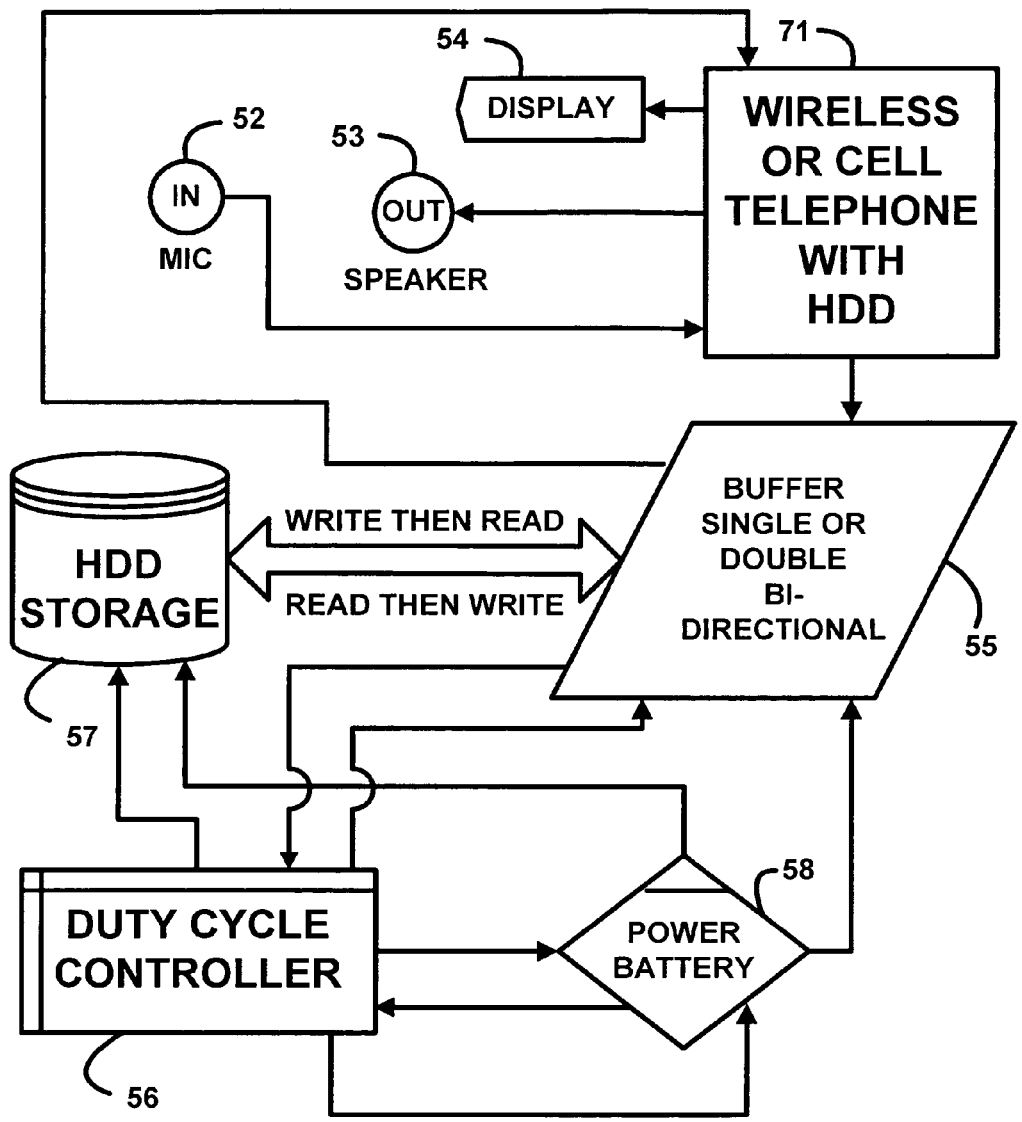
FIG. 7 is a block diagram of a preferred embodiment of a wireless cell phone with hard disk drive (HDD) in accordance with the present invention.
Figure 8:
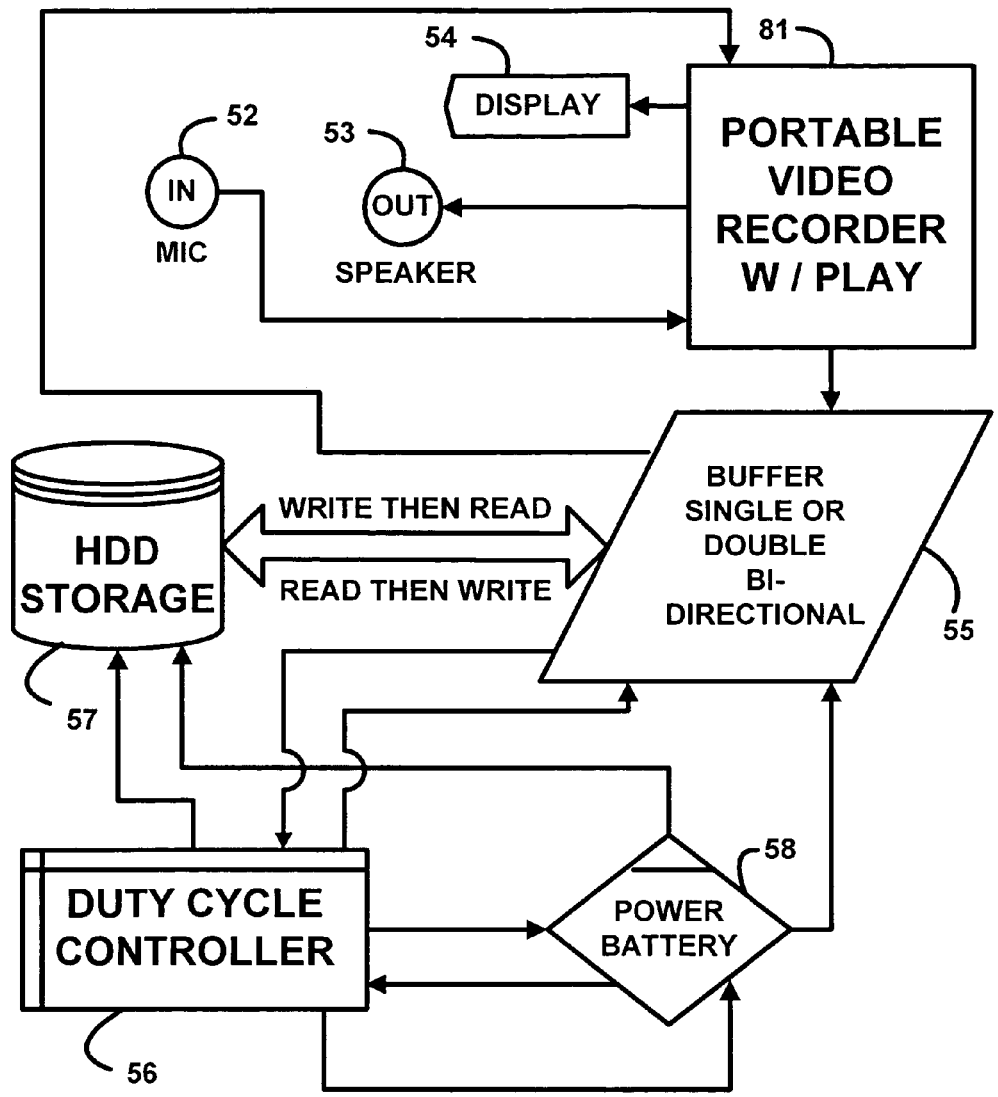
FIG. 8 is a block diagram of a preferred embodiment of a portable video recorder with play(er) in accordance with the present invention.
Figure 9:
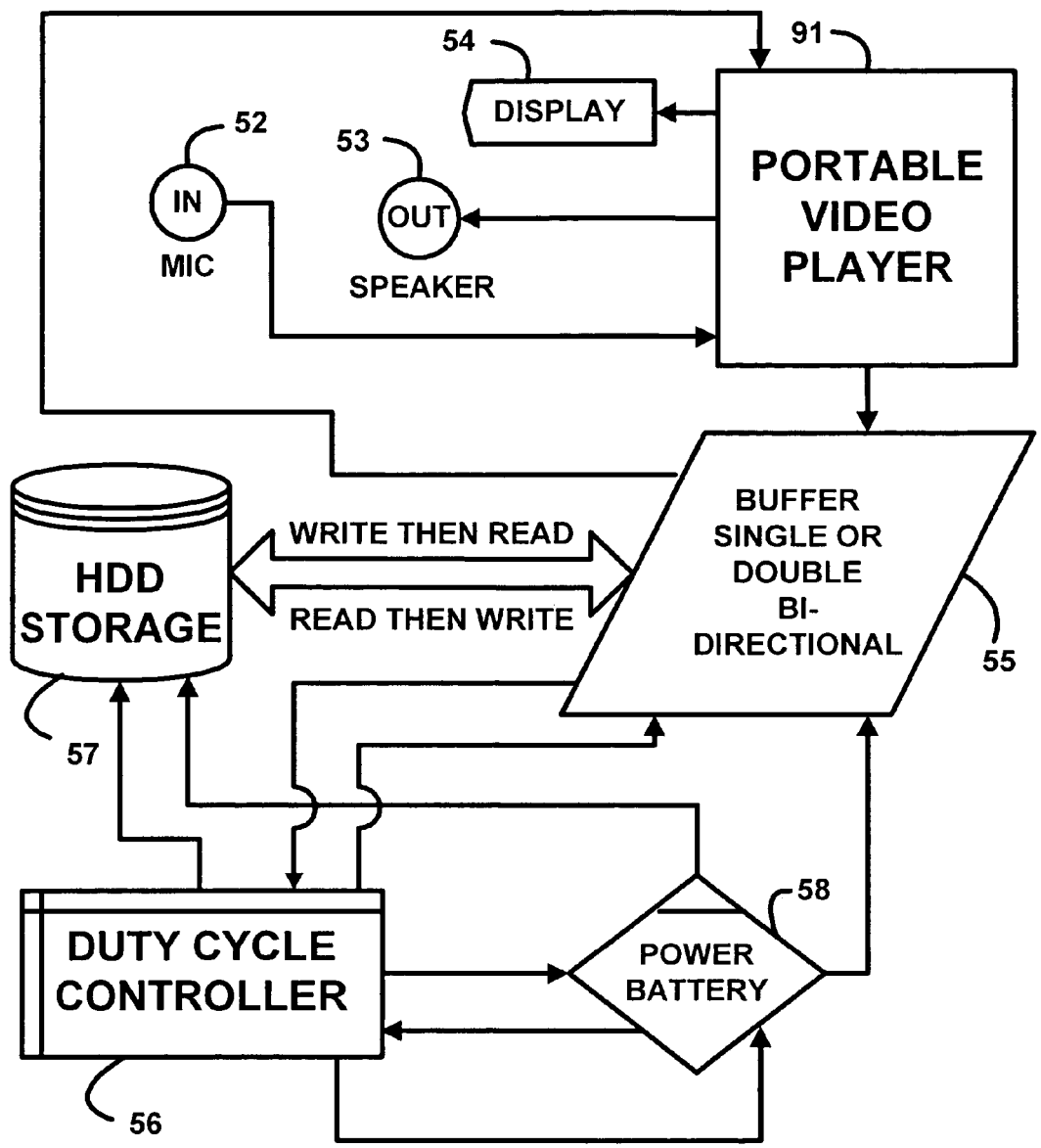
FIG. 9 is a block diagram of a preferred embodiment of a portable video player in accordance with the present invention.
Figure 10:
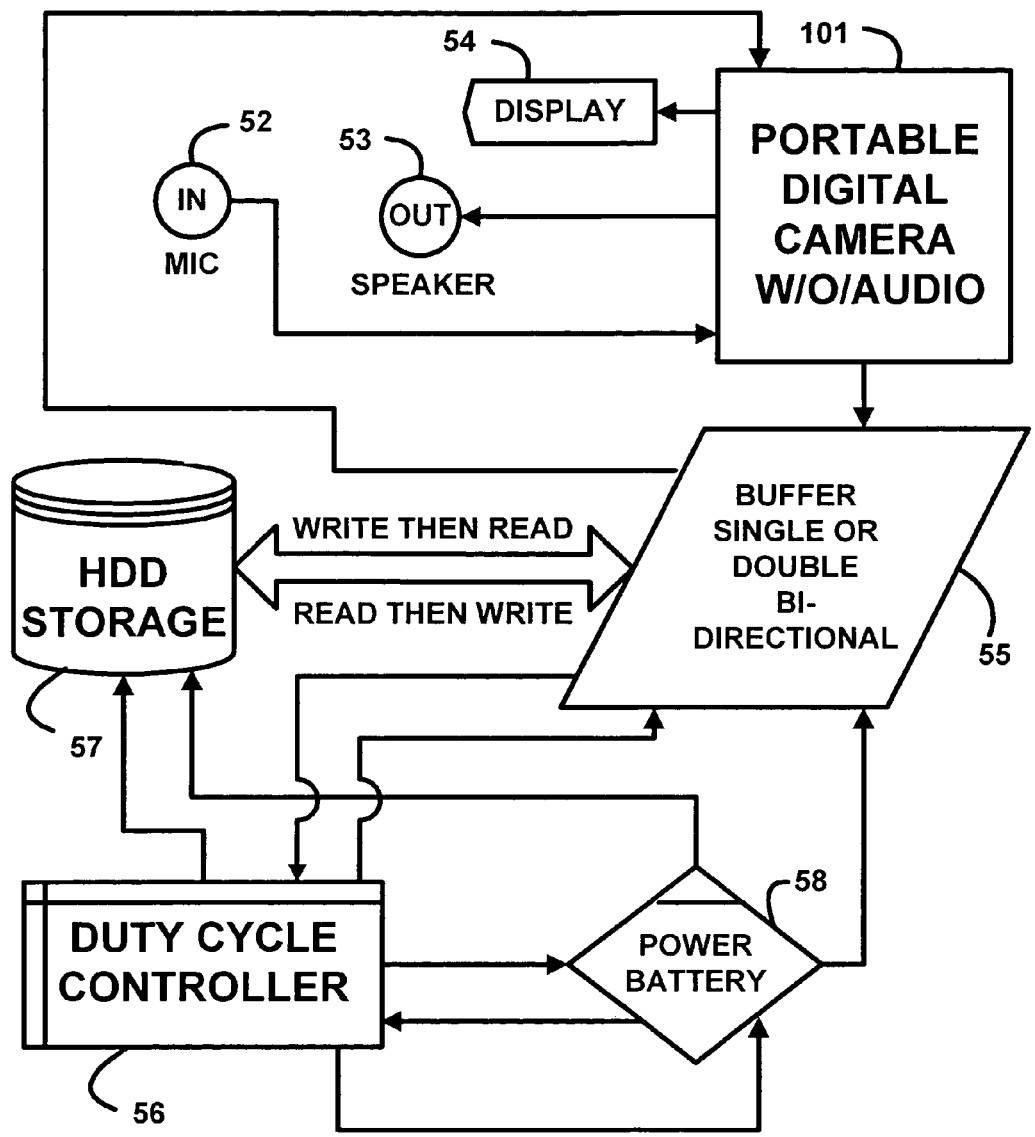
FIG. 10 is a block diagram of a preferred embodiment of a portable video camera without audio in accordance with the present invention.
Figure 11:
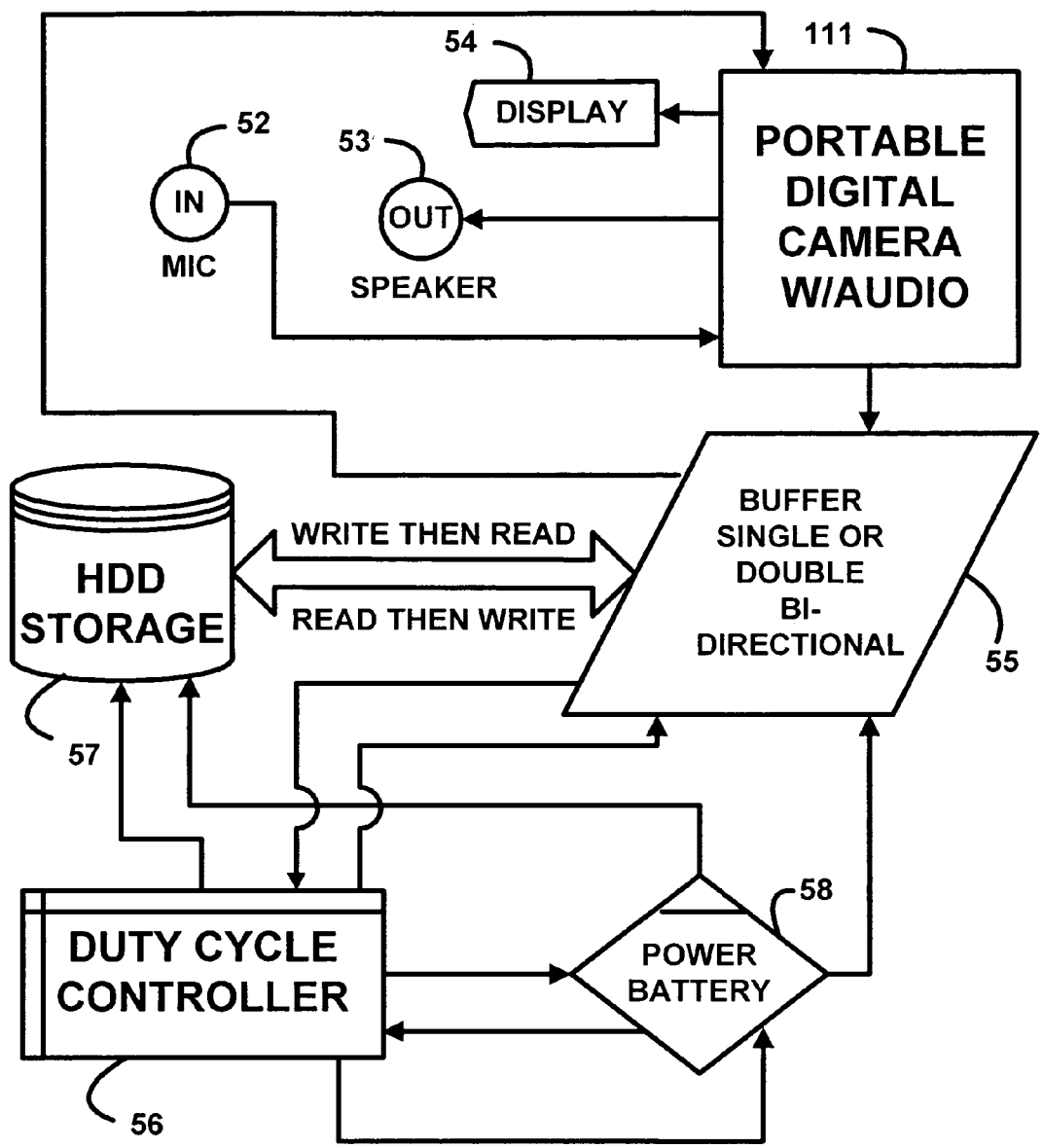
FIG. 11 is a block diagram of a preferred embodiment of a portable video camera with audio in accordance with the present invention.

Still further likewise, a block diagram of a preferred embodiment of a wireless cell phone with hard disk drive (HDD) 71 is shown in FIG. 7; a portable video recorder with play(er) 81 is shown in FIG. 8, a portable video player 91 is shown in FIG. 9; a portable video camera without audio 101 is shown in FIG. 10; and a portable video camera with audio 111 is shown in FIG. 11. All will be observed to use a solid state buffer in accordance with the present invention in a data path to, and from, a hard disk storage, or hard disk drive, or HDD.

Figure 12:
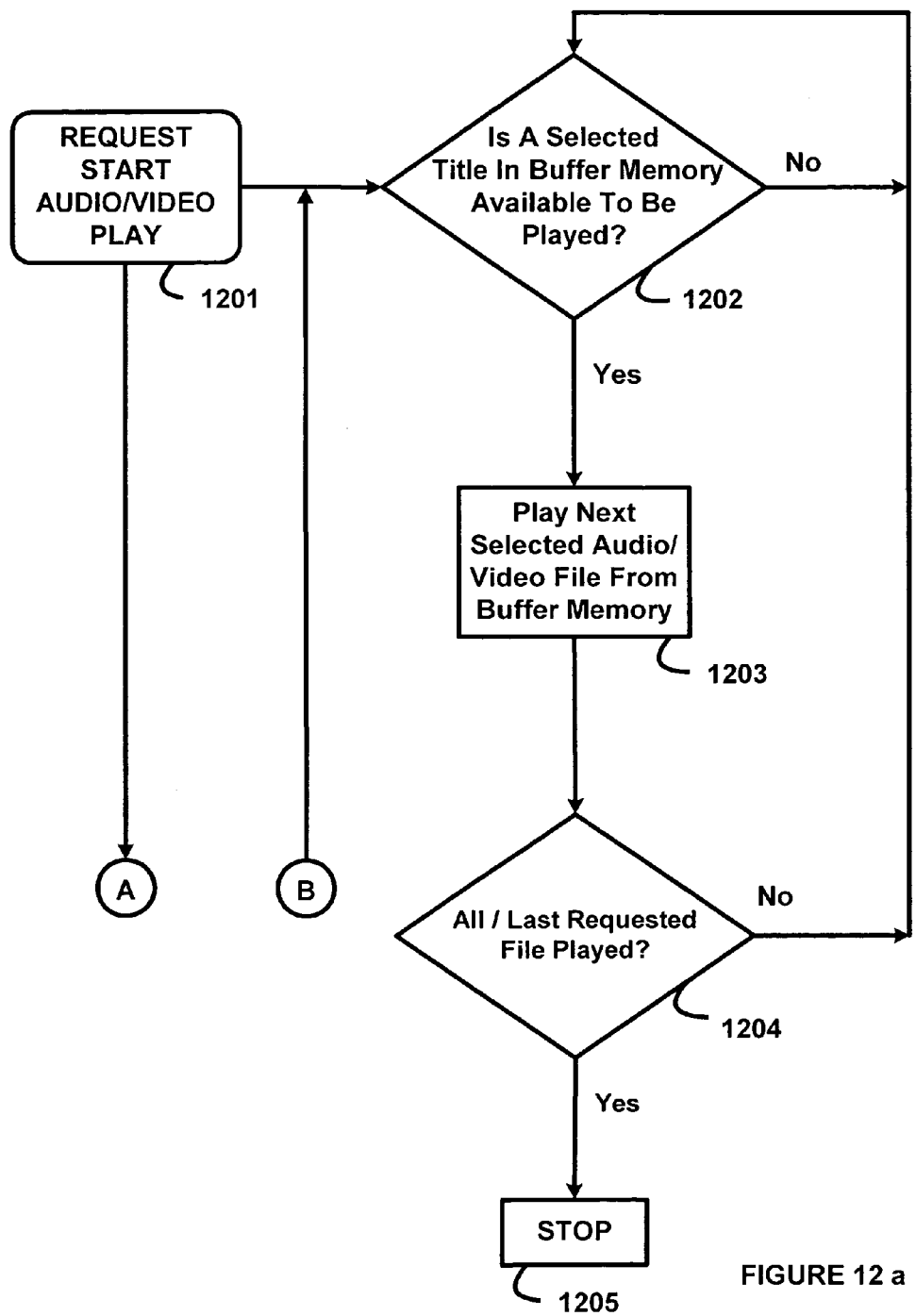
FIG. 12, consisting of FIGS. 12a through 12c, is a functional flow diagram of a preferred embodiment of the method of the present invention for buffering data read from a hard disk drive in, most typically, a portable device with audio and/or pictures.
Figure 12B:
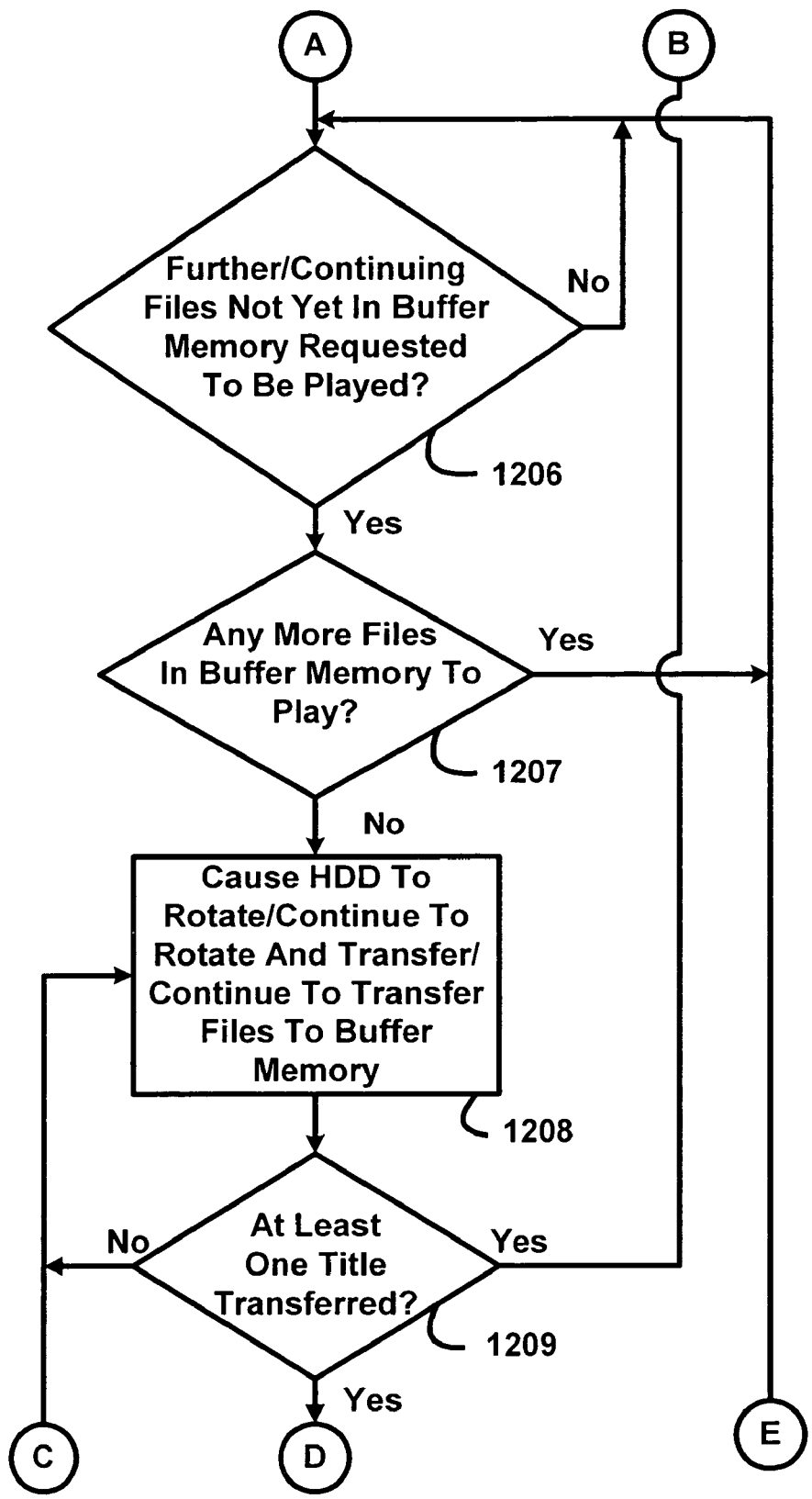
Figure 12C:
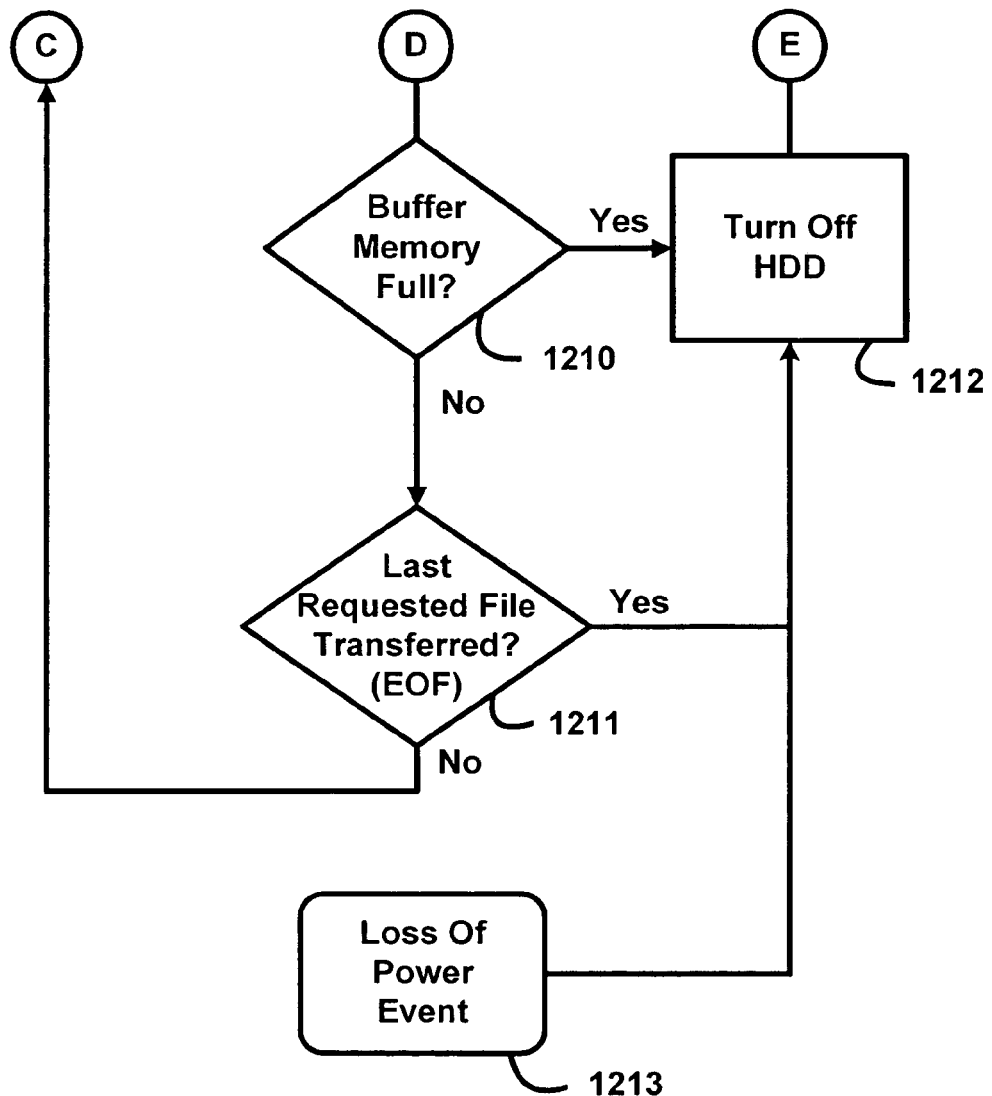

A functional flow diagram of a preferred embodiment of the method of the present invention for buffering data read from a hard disk drive in, most typically, a portable device with audio and/or pictures is shown in FIG. 12, consisting of FIGS. 12a through 12c. After initiation in block 1201 the blocks 1202-1205 on FIG. 12a may be considered the playing of audio visual files. Particularly in block 1202 a "wait loop" is created, where no file is played (nor can be played) until available in buffer memory. One way that a file can so become available is indicated in path B-B where at least one file is determined to have been transferred in to the buffer memory from the HDD by decision occurring in decision block 1209 shown in FIG. 12b. The blocks 1206-1213 of FIGS. 12b and 12c generally concern the management of the buffer memory, and the flow chart may be followed to note that when the buffer memory is full, or if no further files are requested, then the HDD is stopped in block 1212.

Figure 13:
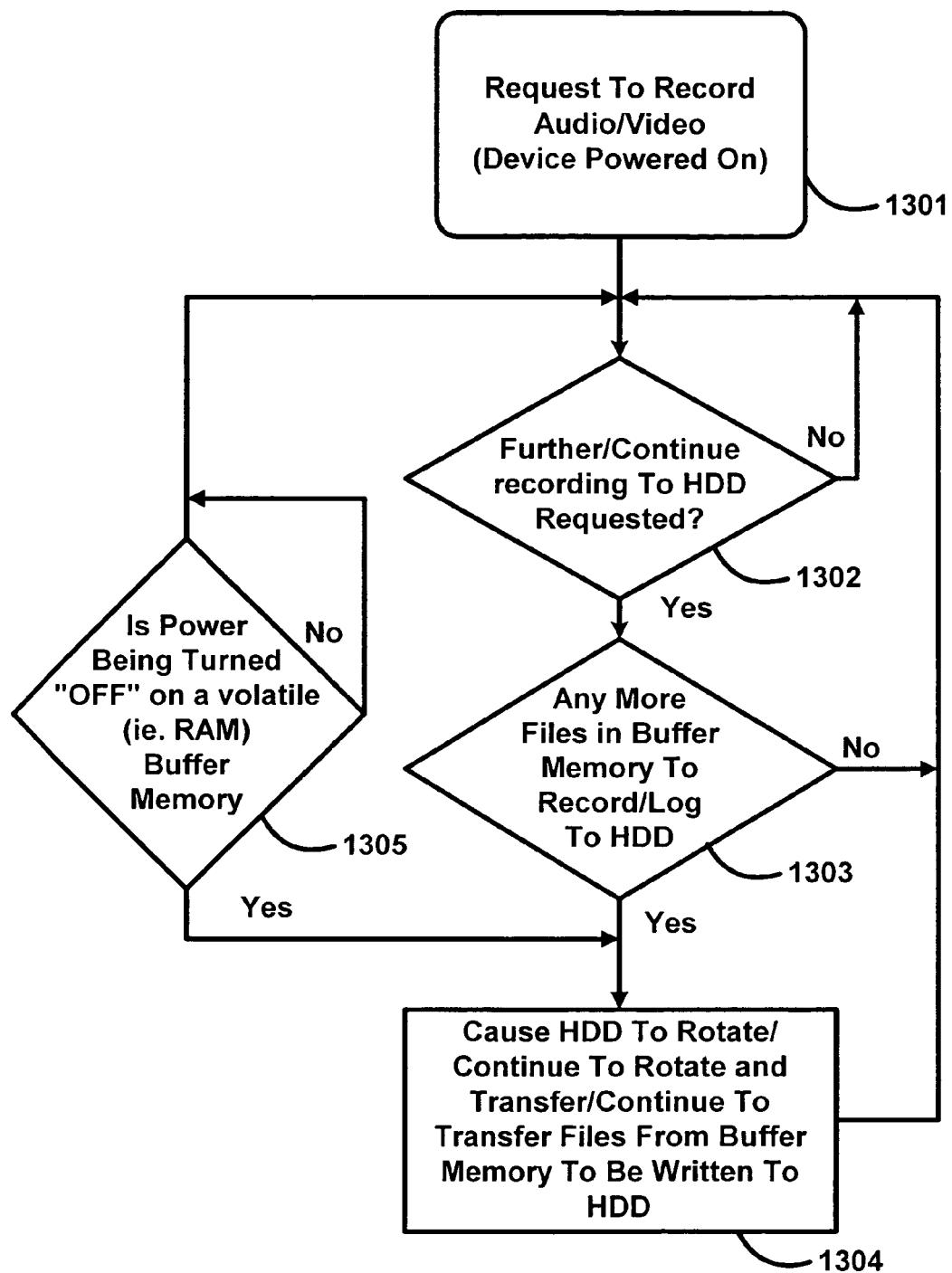
FIG. 13 is a functional flow diagram of a preferred embodiment of the method of the present invention for buffering data written to a hard disk drive in, most typically, a portable device with audio and/or pictures.

Similarly, a functional flow diagram of a preferred embodiment of the method of the present invention for buffering data written to a hard disk drive in, most typically, a portable device with audio and/or pictures is shown in FIG. 13. The management of the buffer memory for logging, or recording, to the HDD is somewhat simpler than the corresponding management for reading block diagrammed in FIG. 12, with the exception of the constant monitoring of power "OFF" in block 1205. If this power "OFF" condition is sensed, then for so long as the condition is maintained, meaning for some milliseconds until all power at the device is truly zero, the action in block 1304 is slightly different than when said block 1304 is entered from block 1303. Namely, the files will not be written one-by-one might be found by some to be implicit in the major loop from 1302-1304, but rather all files will be written. This minor distinction seemingly does not justify yet another, new, flow chart. Moreover, even the major loop 1302-1304 can correctly be interpreted to call for the logging of all files that are within the buffer memory.

In accordance with the preceding explanation, variations and adaptations of the combination CD-ROM and MP3 recorder/player in accordance with the present invention will suggest themselves to a practitioner of the data compression and decompression, and the audio recording and playback, arts. For example, the Hard Disk 30 could be replaced with any rotating mass memory store. For example, encoding and decoding currently done in accordance with the MP3 standard could alternatively be done in the MNA standard as successor to the MP3 standard. According to these differences in terminology, the named elements and process steps of the following claims should be broadly interpreted.

Moreover, in accordance with these and other possible variations and adaptations of the present invention, the scope of the invention should be determined in accordance with the following claims, only, and not solely in accordance with that embodiment within which the invention has been taught.

What is claimed is:

1. A method of conserving power in an electronic device reading digital data from a rotating disk storing digital data in order to display visual images and/or produce audible sounds from the read data, the method comprising:

rotating a disk storing digital data in order to concurrently first-read digital data from the disk via a disk memory into a buffer memory, whereupon the buffer memory becomes filled the rotating of the disk by a motor and the first-reading of the disk via the disk memory are both stopped and the motor and the disk memory powered off; and, to the extent digital data then exists within the buffer memory, second-reading digital data from the buffer memory so that, concurrently with the second-reading, visual images are displayed and/or audible sounds are produced from the second-read digital data;

wherein the second-reading, and the concurrent displaying of visual images and/or producing of audible sounds, transpire during intervals when both the motor causing disk rotation and the disk memory are stopped and powered off because the buffer memory is filled from the rotating disk much faster than the buffer memory is second-read.

2. The power-conserving method according to claim 1 wherein the digital data within the rotating disk is encoded; and wherein, relationally to earlier-performed steps of rotating and concurrent first-reading, and to later-performed steps of second-reading and concurrent displaying of visual images and/or producing of audible sounds, the method further comprises the step of:

decoding the encoded digital data read from the rotating disk concurrently with the first-reading;

wherein the encoded digital data first-read from the rotating disk is decoded before being placed into the buffer memory.

3. The power-conserving method according to claim 1
wherein the digital data within the rotating disk is encoded; and
wherein, relationally to earlier-performed steps of rotating and concurrent first-reading, and to later-performed steps of second-reading and concurrent displaying of visual images and/or producing of audible sounds, the method further comprises the step of:
decoding the encoded digital data read from the rotating disk concurrently with the second-reading and the displaying of visual images and/or producing of audible sounds;
wherein the encoded digital data first-read from the rotating disk is decoded only upon being second-read from the buffer memory.

4. The power-conserving method according to claim 1
wherein the digital data within the rotating disk is encoded in accordance with any of the MPEG standards, of the MP3, WWA, MP-Pro, AAC, DIVX, DVD, SADC, Super CD, or QOOS standards, and
wherein the method comprises a further step of:
decoding the encoded digital data read from the rotating disk.

5. The power-conserving method according to claim 1
wherein the disk rotating and the first-reading continues until the buffer memory is filled or all desired files are retrieved, whichever comes first.

6. The power-conserving method according to claim 1 extended to and in an electronic device also writing digital data representing visual images and/or audible sounds to the rotating disk storing digital data, the extended method further comprising:
digitally encoding in real time digital data representing visual images and/or audible sounds; and concurrently
first-writing in real time the encoded digital data to a buffer memory store until at least so much digitally-encoded data has been written as represents a complete visual image and/or a contiguous segment of sound without detectable pauses; and then
rotating the disk while concurrently second-writing digital data from the buffer memory via a disk memory into the rotating disk
wherein rotation of the rotating disk is stopped and the disk memory powered of upon at least some times while the digitally encoding and the concurrent first-writing are ensuing.

7. The extended power-conserving method according to claim 6
wherein the first-writing continues until the buffer memory is emptied or all desired files are written to the disk, whichever comes first.

8. The power-conserving method according to claim 1 applied to an electronic device that is portable.

9. A portable electronic device comprising:
a rotating disk storing a relatively larger amount of digital data representing images and/or sounds, the rotating disk spinning up, rotating in order to read digital data, and then stopping;
a solid state memory storing a relatively smaller amount of digital data representing images and/or sounds;
a player producing visually perceptible images and/or audibly perceptible sounds from digital data read from the solid state memory store; and a controller causing (1) the rotating disk to rotate so as to progressively read a block of the digital data via a disk memory to the solid state memory during a first time interval, and (2) causing the player to produce the visually perceptible images and/or audibly perceptible sounds from the same block of digital data progressively read from the solid state memory during a second time interval;
wherein the second time interval is sufficiently longer than is the first time interval so that the rotating disk will stop and the disk memory will be powered off between reading successive blacks of digital data to the solid state memory;
wherein the solid state memory serves as a buffer memory to the reading of the rotating disk; and
wherein energy is conserved in the rotating disk because it is stopped and because the disk memory is powered off between reading successive blocks of digital data.

10. The portable electronic device according to claim 9
wherein the first time interval is partially overlapped with the second time interval.

11. The portable electronic device according to claim 9
wherein the controller causes the rotating disk to rotate so and to progressively read a block of the digital data to the solid state memory during the first time interval until the solid state memory is full, or until the block ends, whichever comes first.

12. A method of conserving power in an electronic device writing digital data representing visual images and/or audible sounds to a rotating disk storing digital data, the method comprising:
digitally encoding in real time digital data representing visual images and/or audible sounds; and concurrently
first-writing in real time encoded digital data to a buffer memory store until at least so much encoded digital data has been written as represents a complete visual image and/or a contiguous segment of sound without detectable pauses; and then
rotating a disk while, concurrently with the rotating, second-writing digital data from the buffer memory via a disk memory into the rotating disk;
wherein the rotation of the rotating disk is stopped, and the disk memory powered down, upon at least some times while the digitally encoding and concurrent first-writing are both ensuing because the second writing is much faster than the first writing.

13. The power-conserving method according to claim 12 where, along with the digitally encoding and concurrent first-writing, the method further comprises;
compressing the digital data first-written within the buffer memory store;
wherein compressed digital data is first-written to the buffer memory store; and
wherein compressed digital data is second-written to the rotating disk.

14. The power-conserving method according to claim 12
wherein the second-writing continues until the buffer memory is empty or all such encoded digital data representative of complete visual images and/or contiguous segments of sound files as is desired has been second-written from the buffer memory into the rotating disk, whichever comes first.

15. The power-conserving method according to claim 12 extended to and in an electronic device also reading the digital data representing visual images and/or audible sounds from the rotating disk storing digital data in order to produce images and/or sounds, the extended method further comprising:
- rotating a disk to concurrently first-read digital data from the rotating disk into a buffer memory; and, to the extent digital data then exists within the buffer memory,
- second-reading digital data from the buffer memory to display visual images and/or produce audible sounds from this second digital data upon and during at least some times when the rotating disk is stopped.

16. The extended power-conserving method according to claim 15
- wherein the first-reading of the rotating disk continues until the buffer memory is full or all such digital data representative of visual images and/or audible sounds as is desired has been retrieved into the buffer memory, whichever comes first.

17. The power-conserving method according to claim 12 applied to an electronic device that is portable.

18. A portable electronic device comprising:
- a rotating disk storing a relatively larger amount of digital data representing images and/or sounds, the rotating disk spinning up, rotating in order to write digital data, and then stopping;
- a solid state memory storing a relatively smaller amount of digital data representing images and/or sounds;
- a source of digital data representing images and/or sounds; and
- a controller causing (1) the source of digital data to store the digital data representing images and/or sounds within the solid state memory during a first time interval, and (2) causing the disk to rotate so that a block of digital data progressively read from the solid state memory may be progressively stored upon the disk via a disk memory during a second time interval;
- wherein the second time interval is sufficiently shorter than is the first time interval so that the rotating disk will stop, and the disk memory will be powered off between writing successive blocks of digital data from the solid state memory;
- wherein the solid state memory serves as a buffer memory to the writing of the rotating disk; and
- wherein energy is conserved in the rotating disk because it is stopped, and because the disk memory is powered off, between writing successive blocks of digital data.

19. A portable electronic device according to claim 18
- wherein the first time interval is partially overlapped with the second time interval.

20. A method of conserving power and improving the quality of recorded information in a digital telephone, the method comprising:
- digitally encoding audio information from the sound environment of the telephone; storing in a buffer memory at least so much digitally-encoded audio information as represents a contiguous segment of sound, without detectable pauses; and
- spinning up a read-writable disk memory, then writing the digital audio informational contents of the buffer memory to the disk memory as one or more informational segments as do each represent a continuous segment of sound, and then powering down the disk;
- wherein the disk is not continuously rotating during all of the digitally encoding and the storing, and thus saves power; and
- wherein the informational segments, including a last such, written to the disk are each complete in representing a continuous segment of sound, and an assemblage of these segments may generally be rendered back into audible sound with a desirable reduction in pauses, and in incomplete final sound segments.

21. The method of conserving power and improving the quality of recorded information in a telephone according to claim 20
- wherein the telephone has a camera:
- wherein the digitally encoding is of audio information plus a digital picture;
- wherein the storing in the buffer memory is of at least so much audio and picture information as represents one complete sound clip and associated picture; and
- spinning up a read-writable disk memory, then writing the digital audio and picture contents of the buffer memory to the disk memory as one or more informational segments as do each represent a complete segment of audio or a complete picture, and then powering down the disk;
- wherein the disk is not continuously rotating during all of the digitally encoding and the storing, and thus saves power:
- wherein the informational segments, including a last such, written to the disk are each complete in representing a continuous segment of sound, or a complete picture, and an assemblage of these segments may generally be rendered back into audible sound with a desirable reduction in pauses, and in incomplete final sound segments, or into a picture that is complete and not partial.

22. The method of conserving power and improving the quality of recorded information in a telephone according to claim 21
- wherein the telephone has a video camera:
- wherein the digitally encoding is of audio information plus video information;
- wherein the storing in the buffer memory is of at least so much audio and video information as represents one complete video clip and associated sound; and
- spinning up a read-writable disk memory, then writing the digital audio and video contents of the buffer memory to the disk memory s one or more informational segments as do each represent a complete video clip, and then powering down the disk memory;
- wherein the disk is not continuously rotating during all of the digitally encoding and the storing, and thus saves power.

23. The method of conserving power and improving the quality of recorded information in a telephone according to claim 21
- wherein the telephone has a video camera:
- wherein the digitally encoding is of audio information plus video information;
- wherein the storing in the solid state buffer memory is of at least so much audio and video information as represents one complete video clip and associated sound; and
- spinning up a read-writable disk memory, then writing the digital audio and video contents of the buffer memory to the disk memory as one or more informational segments as do each represent a complete video clip, and then powering down the disk memory;
- wherein the disk is not continuously rotating during all of the digitally encoding and the storing, and thus saves power.

24. A power-conserving digital telephone comprising:
- a digital encoder of audio information from the sound environment of the telephone;
- a buffer memory storing at least so much digitally-encoded audio information as represents a contiguous segment of sound, without detectable pauses; and a read-writable rotating disk storing multiple contiguous segments of sounds, the rotating disk spinning up, rotating in order to be written with digital data, and then stopping; and a controller causing (1) the digital encoder to store the digital data representing audio within the solid state memory during a first time interval, and (2) causing the disk to rotate so that a block of digital data progressively read from the solid state memory will be progressively stored upon the disk during a second time interval;

wherein the second time interval is sufficiently shorter than is the first time interval so that the rotating disk will stop between writing successive blocks of digital data from the solid state memory;

wherein the solid state memory serves as a buffer memory to the writing of the rotating disk; and wherein energy is conserved in the rotating disk because it is stopped between writing successive blocks of digital data.

25. A power-conserving digital telephone according to claim 24
wherein the first time interval is partially overlapped with the second time interval.

26. A method of conserving power and improving the quality of recorded information in a digital telephone, the method comprising:

digitally encoding audio information from the sound environment of the telephone;

storing in a solid state buffer memory at least so much digitally-encoded audio information as represents a contiguous segment of sound, without detectable pauses; and spinning up a read-writable disk memory, then writing the digital audio informational contents of the solid state buffer memory to the disk memory as one or more informational segments as do each represent a continuous segment of sound, and then powering down the disk;

wherein the disk is not continuously rotating during all of the digitally encoding and the storing, and thus saves power; and wherein the informational segments, including a last such, written to the disk are each complete in representing a continuous segment of sound, and an assemblage of these segments may generally be rendered back into audible sound with a desirable reduction in pauses, and in incomplete final sound segments.

27. The method of conserving power and improving the quality of recorded information in a telephone according to claim 26
wherein the telephone has a camera:
wherein the digitally encoding is of audio information plus a digital picture;
wherein the storing in the solid state buffer memory is at least so much audio and picture information as represents one complete sound clip and associated picture; and spinning up a read-writable disk memory, then writing the digital audio and picture contents of the solid state buffer memory to the disk memory as one or more informational segments as do each represent a complete segment of audio or a complete picture, and then powering down the disk;

wherein the disk is not continuously rotating during all of the digitally encoding and the storing, and thus saves power:

wherein the informational segments, including a last such, written to the disk are each complete in representing a continuous segment of sound, or a complete picture, and an assemblage of these segments may generally be rendered back into audible sound with a desirable reduction in pauses, and in incomplete final sound segments, or into a picture that is complete and not partial.

28. A method of conserving power and improving the quality of recorded information in a digital camera, the method comprising:

digitally encoding audio information from the environment of the digital camera;

storing in a buffer memory at least so much digitally-encoded environmental information as represents a contiguous segment of video and/or audio, without detectable scene breaks or pauses; and spinning up a read-writable disk memory, then writing the digital audio informational contents of the buffer memory to the disk memory as one or more informational segments as do each represent a continuous segments of video and/or audio, and then powering down the disk;

wherein the disk is not continuously rotating during all of the digitally encoding and the storing, and thus saves power; and wherein the informational segments, including a last such, written to the disk are each complete in representing a continuous segments of video and/or audio, and an assemblage of these segments may generally be rendered back into audio and/or video with a desirable reduction in pauses, and in incomplete final audio and/or video segments.

29. The method of conserving power and improving the quality of recorded information in a digital camera according to claim 28
wherein the digital camera is a still camera; wherein the digitally encoding information from the environment of the camera is digital picture;
wherein the storing in the buffer memory is of at least so much digitally-encoded environmental information as represents one complete picture; and spinning up a read-writable disk memory, then writing the digital picture contents of the buffer memory to the disk memory as one or more informational segments as do each represent a complete digital picture, and then powering down the disk;

wherein the disk is not continuously rotating during all of the digitally encoding and the storing, and thus saves power;

wherein the informational segments, including a last such, written to the disk are each complete in representing a picture, and an assemblage of these segments may generally be rendered back into a picture or pictures that are complete and not partial.

30. The method of conserving power in a digital camera according to claim 28
wherein the digital camera is a video camera;
wherein the digitally encoding information from the environment of the camera is digital video;
wherein the storing in the buffer memory is of at least so much digital video information as represents one continuous video clip, without scene breaks; and spinning up a read-writable disk memory, then writing the digital video information of the buffer memory to the disk memory, and then powering down the disk;

wherein the disk is not continuously rotating during all of the digitally encoding and the storing, and thus saves power.

31. The method of conserving power and improving the quality of recorded information in a digital camera according to claim 28
- wherein the digital camera is a video camera;
- wherein the digitally encoding information from the environment of the camera is digital video;
- wherein the storing in the buffer memory is of at least so much digital video information as represents one continuous video clip, without scene breaks; and
- spinning up a read-writable disk memory, then writing the digital video information of the buffer memory to the disk memory as one or more informational segments as do each represent a complete video clip, and then powering down the disk memory;
- wherein the disk is not continuously rotating during all of the digitally encoding and the storing, and thus saves power.

32. A method of conserving power and improving the quality of recorded information in a digital video player, the method comprising:
- spinning up and rotating a readable digital disk memory upon which is recorded at least so much digitally-encoded information as represents at least one complete contiguous segment, or clip, of video without detectable video scene breaks or pauses, with a last segment of recorded digitally-encoded information not necessarily being a complete video clip;
- writing digital video information from the disk memory to a non-rotating buffer memory as one or more informational segments as do each represent a complete video clip; and
- ceasing rotation of the digital disk memory; while
- displaying video from the digital video information stored within and read from the non-rotating buffer memory as successive video clips that are each complete, including a final such video clip;
- wherein since (1) only complete video clips without detectable scene breaks or pauses are written from the disk memory to the buffer memory, and (2) the displaying of video is from the digital video information stored within the buffer memory, then (3) no display of any video clip, including a final video clip, is ever made of any video clip that is not complete, nor that contains detectable video scene breaks or pauses.

33. The method of conserving power and improving the quality of recorded information in a digital video player according to claim 32
- wherein the digital video information read from the readable digital disk memory is compressed; and
- wherein, between, as first-performed steps, the spinning up and rotating and the writing, and, as last performed steps, the ceasing rotation and the displaying, the method further comprises:
- decompressing the digital video information read from the readable digital disk memory.

34. The method of conserving power and improving the quality of recorded information in a digital video player according to claim 33
- wherein the digital video information read from the readable digital disk memory is compressed; and
- wherein, between, as first-performed steps, the spinning up and rotating and the writing and the ceasing rotation, and, as a last-performed step, the displaying, the method further comprises:
- decompressing the digital video information read from the non-rotating buffer memory.

35. The method of conserving power and improving the quality of recorded information in a digital video player according to claim 33
- wherein the digital video player is further for recording video, and is thus a digital video player/recorder; and
- wherein the readable digital disk memory is also writable, and is thus a read-writable digital disk memory, and
wherein the method further comprises:
- digitally encoding information from the environment of the digital video player/recorder;
- storing in a buffer memory at least so much digitally-encoded environmental information as represents a contiguous segment of video without detectable scene breaks;
- spinning up and rotating the read-writable digital disk memory; then
- writing the digitally-encoded environmental information contents of the buffer memory to the read-writable digital disk memory; and then
- ceasing rotation of the read-writable digital disk memory; wherein the disk is not continuously rotating during all of the digitally encoding and the storing, and thus saves power.

36. The power-conserving and quality-improving method according to claim 35 applied to an digital video player that is portable.

* * * * *